(12) United States Patent
Sugiyama et al.

(10) Patent No.: US 8,681,143 B2
(45) Date of Patent: Mar. 25, 2014

(54) DISPLAY APPARATUS, MOBILE OBJECT AND CONTROL APPARATUS

(75) Inventors: Keiji Sugiyama, Kyoto (JP); Kenichi Kasazumi, Osaka (JP); Kakuya Yamamoto, Hyogo (JP); Akira Kurozuka, Osaka (JP); Shinichi Shikii, Nara (JP)

(73) Assignee: Panasonic Corporation, Osaka (JP)

( * ) Notice: Subject to any disclaimer, the term of this patent is extended or adjusted under 35 U.S.C. 154(b) by 114 days.

(21) Appl. No.: 13/484,811

(22) Filed: May 31, 2012

(65) Prior Publication Data

US 2012/0236046 A1  Sep. 20, 2012

Related U.S. Application Data

(63) Continuation of application No. PCT/JP2011/004851, filed on Aug. 31, 2011.

(30) Foreign Application Priority Data

Oct. 1, 2010 (JP) .................................. 2010-223738

(51) Int. Cl.
  *G06F 3/038* (2013.01)
  *G02B 27/14* (2006.01)
  *G09G 5/00* (2006.01)
  *G09G 3/00* (2006.01)

(52) U.S. Cl.
  USPC .................. 345/214; 359/630; 345/7; 345/32

(58) Field of Classification Search
  CPC ........................... G02B 21/01; G09G 2320/041
  USPC ........................ 345/7–8, 32, 84, 204; 359/630
  See application file for complete search history.

(56) References Cited

U.S. PATENT DOCUMENTS 4,932,731 A * 6/1990 Suzuki et al. .................... 359/13
4,973,132 A * 11/1990 McDonald et al. ............. 359/13
(Continued)

FOREIGN PATENT DOCUMENTS

EP  1180710 A2 * 2/2002 ............. G02B 27/01
GB  2054195 A * 2/1981 ............... G02B 5/28
(Continued)

OTHER PUBLICATIONS

International Search Report issued Oct. 4, 2011 in International (PCT) Application No. PCT/JP2011/004851.

*Primary Examiner* — Dwayne Bost
*Assistant Examiner* — Ivelisse Martinez Quiles
(74) *Attorney, Agent, or Firm* — Wenderoth, Lind & Ponack, L.L.P.

(57) ABSTRACT

A display apparatus, includes: a display light emission unit which includes a light source, forms an image, and emits display light corresponding to formed image; a deflection unit which deflects the display light; a narrow band reflection unit which has characteristics of reflecting only light in a reflected wavelength range and transmitting light of wavelengths other than the reflected wavelength range, and reflects the display light incident from the deflection unit towards a viewpoint; and a control unit which changes an incidence angle at which the display light is incident on the narrow band reflection unit, in accordance with change in a wavelength of the light, wherein the narrow band reflection unit is configured such that the reflected wavelength range changes when an incidence angle of light changes, and the control unit changes the incidence angle such that a wavelength of the light is included within the reflected wavelength range.

18 Claims, 35 Drawing Sheets

(56) References Cited

U.S. PATENT DOCUMENTS

| | | | |
|---|---|---|---|
| 4,998,784 A * | 3/1991 | Freeman et al. | 359/15 |
| 5,187,597 A * | 2/1993 | Kato et al. | 359/22 |
| 5,475,512 A * | 12/1995 | Nakazawa et al. | 359/13 |
| 5,748,377 A * | 5/1998 | Matsumoto et al. | 359/633 |
| 5,760,931 A * | 6/1998 | Saburi et al. | 359/13 |
| 5,999,314 A * | 12/1999 | Asakura et al. | 359/485.02 |
| 6,844,980 B2 * | 1/2005 | He et al. | 359/630 |
| 7,131,728 B2 * | 11/2006 | Nambudiri et al. | 353/13 |
| 2003/0214724 A1 * | 11/2003 | Fujikawa et al. | 359/630 |
| 2004/0066547 A1 * | 4/2004 | Parker et al. | 359/15 |
| 2004/0135742 A1 * | 7/2004 | Weber et al. | 345/7 |
| 2005/0270655 A1 * | 12/2005 | Weber et al. | 359/630 |
| 2007/0279755 A1 * | 12/2007 | Hitschmann et al. | 359/630 |
| 2009/0160736 A1 * | 6/2009 | Shikita | 345/7 |

FOREIGN PATENT DOCUMENTS

| | | | | |
|---|---|---|---|---|
| JP | 58-181004 | | 10/1983 | |
| JP | 9-222582 | | 8/1997 | |
| JP | 9222582 A | * | 8/1997 | G02B 27/01 |

* cited by examiner

FIG.15

| VERTICAL DISTANCE FROM CENTER OF SCREEN | DIFFUSION DIRECTION |
|---|---|
| 5mm~6mm | 5 DEGREES |
| 4mm~5mm | 4 DEGREES |
| .... | |
| -1mm~0mm | 0 DEGREES |
| .... | |
| -5mm~-6mm | -5 DEGREES |

FIG.16

| ANGULAR DIFFERENCE FROM DESIGNED INCIDENCE ANGLE | SHIFT AMOUNT OF WAVELENGTH |
|---|---|
| -5 DEGREES | 8.7nm |
| -4 DEGREES | 6.9nm |
| .... | |
| 0 DEGREES (DESIGN WAVELENGTH) | 0nm |
| .... | |
| 5 DEGREES | -8.0nm |

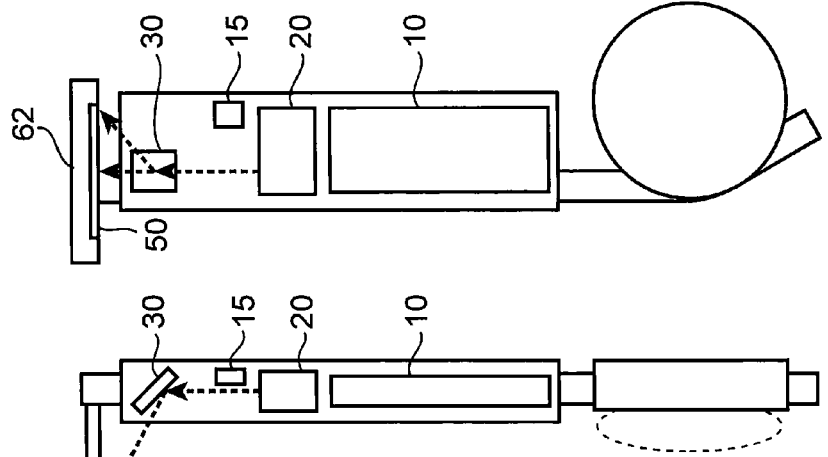
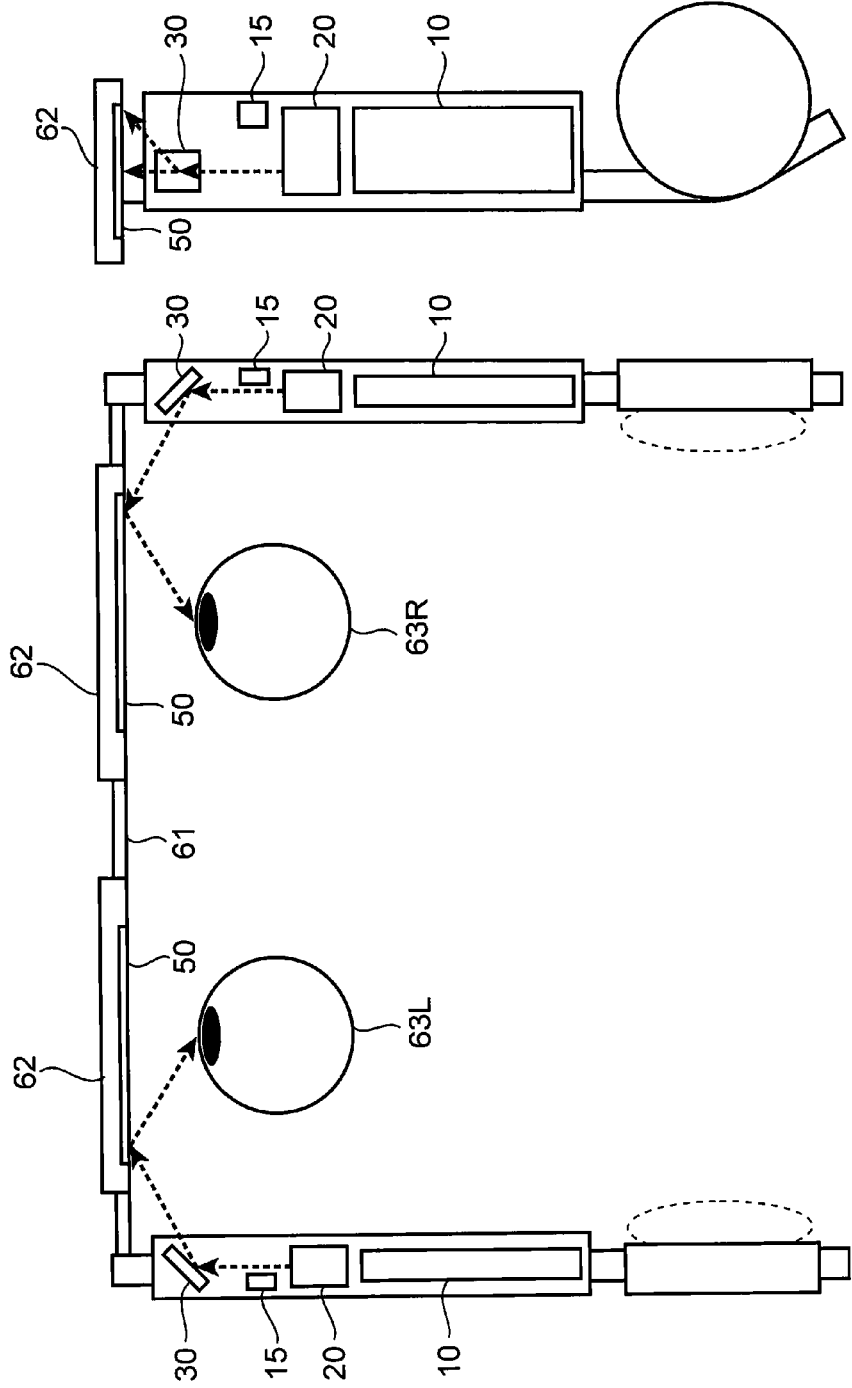

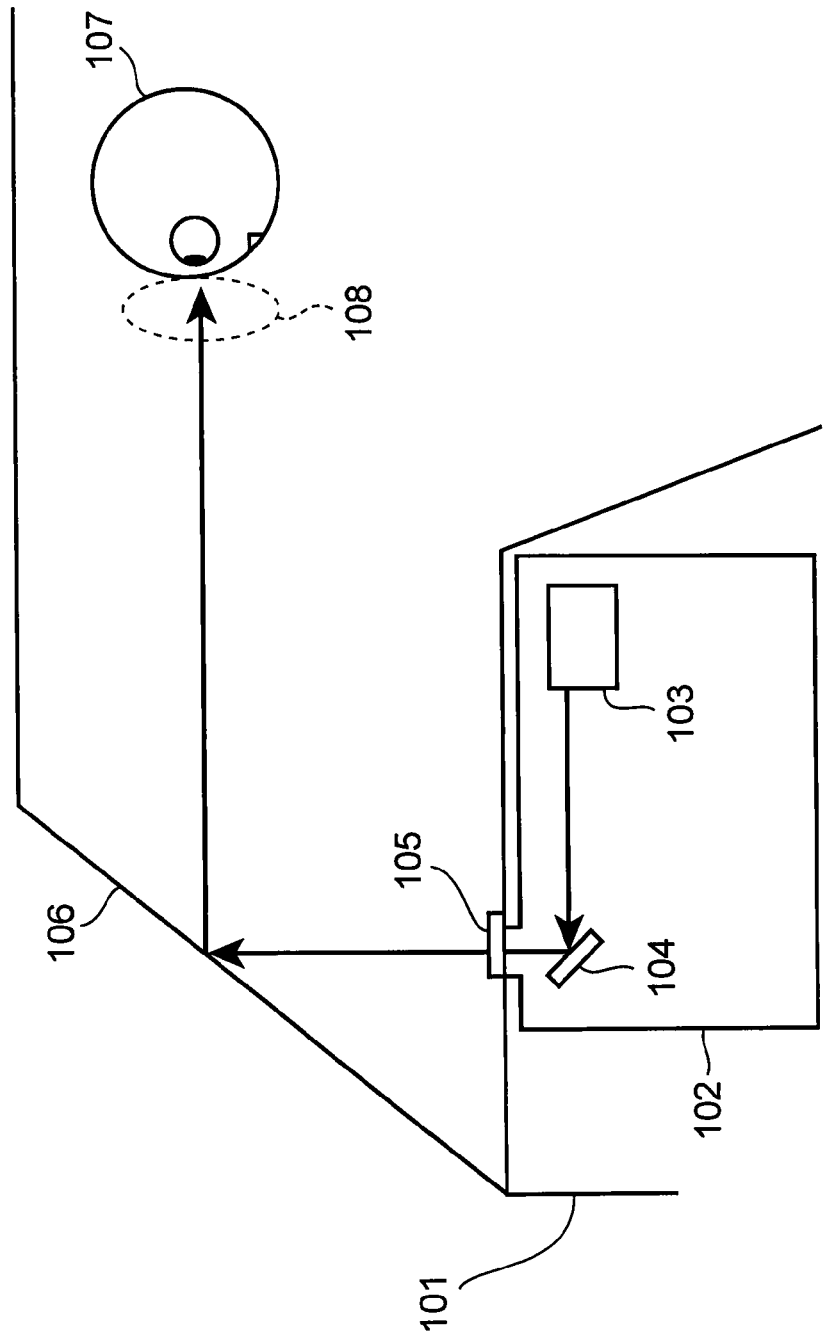

DISPLAY APPARATUS, MOBILE OBJECT AND CONTROL APPARATUS

This application is a Continuation of International Application No. PCT/JP2011/004851, with the International Filing Date of Aug. 31, 2011.

BACKGROUND OF THE INVENTION

1. Field of the Invention

The present invention relates to a display apparatus which can be applied to a device which displays a video image in superimposed fashion on a background view of the outside world which can be seen from a display region having transmissive properties, whereby the video image and the background view of the outside world are viewed together, and to a mobile object having the display apparatus, and a control apparatus which controls the image display unit.

2. Description of the Background Art

A driver who is driving a vehicle, such as an automobile, is required to perform tasks such as ascertaining the circumstances outside the vehicle while driving, reading information on a display apparatus of the vehicle, and carrying out driving operations, and the like, safely and quickly, and therefore desirably the driver is able to read out information on the display apparatus of the vehicle without the range of movement of the driver's viewpoint leaving the range required to ascertain the circumstances outside the vehicle while driving. Consequently, an image display apparatus is anticipated, which displays text characters or images by irradiating light onto a portion of a transparent sheet, such as the windshield of the vehicle, for instance.

Possible examples of a transmissive display apparatus of this kind are a head-up display which displays driving information on the windshield of an automobile (hereinafter, called HUD), and a head-mounted display which displays information on lens portions of eyeglasses (hereinafter, called HMD), and the like. When a transmissive device of this kind is used, a driver is able to see information relating to driving (for example, a map or speedometer) while simultaneously viewing the outside world, and therefore it is expected that the driver is able to drive more safely.

A conventional HUD is one which projects a virtual image onto a windshield. FIG. 28 shows an example of a conventional HUD. In this example, it is possible for a driver to see a view of the outside world and to view display light, simultaneously, by reflecting the display light toward the driver in a portion of the windshield.

In FIG. 28, 101 denotes a vehicle body in which the HUD is installed. 102 denotes an HUD optical unit which is accommodated inside a dashboard, and which comprises a display unit 103 and a deflection unit 104 inside. The display unit 103 consists of a liquid crystal element and a light source, for example, and displays information that is to be displayed to the driver 107. The display light displayed on the display unit 103 is projected toward the deflection unit 104. The deflection unit 104 is constituted by a mirror, or the like, and deflects the display light from the display unit 103 toward the windshield 106. The display light deflected by the deflection unit 104 is projected onto the windshield 106 by passing through an optical system aperture section 105 of the HUD optical unit 102. The windshield 106 reflects the display light from the HUD optical unit 102 toward the driver 107. The driver 107 is able to view information relating to driving operations, by looking at the display light reflected by the windshield 106. An eyebox 108 indicates the range in which the image is visible when the driver 107 moves his or her head, and when the eyes of the driver 107 are inside the eyebox 108, the display light reaches the retinas of the driver 107 and the driver 107 is able to see the image. Furthermore, the windshield 106 transmits light from outside (outside world) of the windshield 106, simultaneously with reflecting the display light from the HUD optical unit 102. Due to these characteristics of the windshield 106, the driver 107 is able to see a view of the outside world of the windshield 106, together with the information displayed by the display unit 103. In this way, in an HUD, it is possible for a driver 107 to view information from the display unit 103 without the driver's line of sight moving away from the outside world, and therefore the requirement for the driver 107 to move his or her line of sight is reduced and the safety during driving is improved.

In the present specification, the ratio of light from outside the windshield 106 which reaches the interior of the vehicle by passing through the windshield 106 is called the outside world transmittance. The higher the outside world transmittance, the more clearly the driver 107 is able to see the view outside the vehicle.

However, in a conventional HUD which reflects display light at the windshield 106 in this way, there is a problem in that a double image is produced. This example is shown in FIG. 29. FIG. 29 is a diagram showing the composition of the windshield 106, in which an intermediate film 201 is disposed between an inner glass 202 and an outer glass 203 which are two sheets that constitute the windshield 106. Incident light 204 which is incident on this windshield 106 is reflected by both the front surface of the inner glass 202 and the rear surface of the outer glass 203, as shown in FIG. 29, thereby giving rise to front surface reflected light 205 and rear surface reflected light 206. In this case, since the light path of the front surface reflected light 205 and the light path of the rear surface reflected light 206 are different due to the thickness of the glass, the driver 107 sees a double image when the driver views the front surface reflected light 205 and the rear surface reflected light 206 at the same time. This phenomenon is called a double image. FIG. 30 shows an example of a double image. In FIG. 30, 301 indicates an image which is seen by a driver 107 due to the front surface reflected light 205. Similarly, 302 indicates an image which is seen by the driver 107 due to the rear surface reflected light 206. As shown in FIG. 30, since the display image 301 and the reflected image 302 have different display positions, the image seen by the driver 107 appears double as shown in FIG. 30. In the present specification, the problem caused by a driver 107 simultaneously viewing reflected light 205 from the front surface of the inner glass 202 and reflected light 206 from the rear surface of the outer glass 203 is called a double image problem.

The method for solving this double image problem may be a method which provides a narrow band filter on the front surface of the windshield (see Japanese Patent Application Publication No. S58-181004, for example). Here, the narrow band filter indicates a filter which reflects, with a high reflectivity, only light of a particular wavelength range, and transmits light of other wavelengths with a high transmissivity. FIG. 31 shows an example of the reflection characteristics of a narrow band filter. FIG. 31 shows the reflectivities of light of respective wavelengths when light is incident at a design incidence angle $\theta a$, in which light of a wavelength included in a reflected wavelength range 501 is reflected with a reflectivity of R, and light of other wavelengths is transmitted without being reflected. To give a specific example of a narrow band filter, it is possible to use a multi-layered film filter which is composed by layering together a material of low refractive index and a material of high refractive index or rugate filter, and the reflectivity R can be raised by using a filter of this kind. In the present specification, the "reflected wavelength range" is a range of wavelengths showing a reflectivity of no less than 80% with respect to a peak reflectivity R, for instance.

FIG. 32 shows an example of preventing the occurrence of a double image by using a narrow band filter of this kind. In FIG. 32, a narrow band filter 401 is disposed on the front surface of the windshield 106, on the interior side of the vehicle. In this case, the reflected wavelength region which is reflected by the narrow band filter 401 is designed so as to coincide with the wavelength range included in the incident light 204, and the incident light 204 is reflected rather than being transmitted by the narrow band filter 401. In this case, since the incident light 204 does not reach the outer glass 203, reflection does not occur at the interface between the outer glass 203 and the air (the rear surface), and the driver sees only the front surface reflected light 205. It is possible to solve the double image problem by using a narrow band filter 401 in this way.

SUMMARY OF THE INVENTION

However, in a case where a narrow band filter 401 is used as a solution for the double image problem, there are drawbacks in dealing with the wavelength range of the light source and reduction in the outside world transmissivity.

The narrow band filter 401 acts on light which is incident from the exterior of the vehicle toward the interior of the vehicle (hereinafter, called "external light"). Therefore, if the narrow band filter 401 reflects wavelengths in a broad range, the transmissivity with respect to external light declines. If the narrow band filter 401 has reflection characteristics such as those shown in FIG. 31, the percentage of the transmissivity of external light (the outside world transmissivity) is given by the value indicated in Formula (1), when the wavelength range of the visible light is taken as W0 and the reflected wavelength range of the narrow band filter 401 is taken as W.

$$\{(W0-W)/W0\}\times 100 \tag{1}$$

In order to ensure good visibility for the driver during driving, the higher the outside world transmissivity, the better. Therefore, the reflected wavelength range W of the narrow band filter 401 is desirably set to a small value.

However, in a case where the reflected wavelength range W is smaller than the wavelength range of the light emitted from the light source used for the display unit 103, a double image occurs even when the narrow band filter 401 is used. FIG. 33 shows a diagram of a case where the wavelength range 601 of the light source is larger than the reflected wavelength range 501 of the narrow band filter 401. In a case where the wavelength range 601 of the light source is large as shown in FIG. 33, light in the wavelength regions not included in the reflected wavelength range 501 of the narrow band filter 401 (namely, light of the wavelength ranges 602 and 603 in FIG. 33) is transmitted rather than being reflected at the narrow band filter 401. Therefore, even if the narrow band filter 401 is provided on the windshield 106 as shown in FIG. 32, a portion of the incident light 204 (the light of the wavelength ranges 602 and 603 in FIG. 33) reaches the outer glass 203, and reflected light which gives rise to a double image is produced. In order to resolve this problem, it is necessary to set the reflected wavelength range 501 of the narrow band filter 401 to be wider than the wavelength range 601 of the light source, but if the reflected wavelength range 501 is large, this leads to decline in the outside world transmissivity as described above. In other words, there is a trade-off between dealing with the wavelength range 601 of the light source and preventing decline in the outside world transmissivity. In the present specification, the "wavelength range of the light source" is the full width at half maximum of the wavelength profile of the light emitted from the light source, for example.

The problem described above occurs even when using a light source having a narrow wavelength range, such as a laser light source, for the light source. In general, the wavelength of laser light emitted from a laser light source changes with temperature. FIG. 34 shows change in the wavelength of laser light with temperature. As shown in FIG. 34, the wavelength of the laser light emitted from the laser light source changes toward the long wavelength side, as the temperature becomes higher. If a temperature is defined T and a coefficient is defined C, the wavelength λ of the laser light emitted from the light source at a temperature T is expressed by Formula (2).

$$\lambda=\lambda\min+(T-T\min)\times C \tag{2}$$

Here, as shown in FIG. 34, $\lambda\min \leq \lambda \leq \lambda\max$ and $T\min \leq T \leq T\max$.

Therefore, even if the wavelength range of the laser light source at a certain temperature is narrow, the wavelength range of the laser light which is emitted by the laser light source changes in a range from λmin to λmax (the temperature change range Wt in FIG. 34) with change in the ambient temperature. If the reflected wavelength range 501 of the narrow band filter 401 is smaller than the range of temperature change of the light source, although no double image is produced at a temperature where the output wavelength of the light source is within the reflected wavelength range 501, a double image will be produced at the point that the output wavelength of the light source moves outside the reflected wavelength range 501 of the narrow band filter 401, due to the temperature of the light source becoming higher or lower. This example is illustrated in FIG. 35 and FIG. 36. FIG. 35 shows a case where the wavelength range 1901 of the laser light source at a certain temperature is within the reflected wavelength range 501 of the narrow band filter 401. In this case, all of the light output from the light source is reflected by the narrow band filter 401, and therefore a double image problem does not arise. FIG. 36 shows a case where the temperature of the laser light source has risen, and the wavelength range 1901 of the light output from the laser light source has moved outside the reflected wavelength range 501 of the narrow band filter 401. Therefore, the light from the light source is transmitted, rather than being reflected at the narrow band filter 401, and a double image problem arises.

In order to respond this kind of variation in the output wavelength depending on the temperature of the light source, the reflected wavelength range 501 of the narrow band filter 401 needs to be set larger than the temperature change range Wt of the light source, but in this case also, making the reflected wavelength range 501 broader leads to decline in the outside world transmissivity.

In Japanese Patent Application Publication No. S58-181004, such a relationship between the wavelength range of the light source or the temperature-dependent change of the light source wavelength and the outside world transmissivity is not taken into consideration.

One non-limiting and exemplary embodiment provides a display apparatus, a mobile object and a control apparatus whereby the occurrence of a double image can be prevented, even if the reflected wavelength range of the narrow band filter is narrow.

Additional benefits and advantages of the disclosed embodiments will be apparent from the specification and Figures. The benefits and/or advantages may be individually provided by the various embodiments and features of the specification and drawings disclosure, and need not all be provided in order to obtain one or more of the same.

In one general aspect, the techniques disclosed here feature; a display apparatus, includes: a display light emission unit which includes a light source emitting light, forms an image using light emitted from the light source, and emits display light corresponding to formed image; a deflection unit which deflects the display light emitted from the display light emission unit; a narrow band reflection unit which has characteristics of reflecting only light in a reflected wavelength range that is a portion of a wavelength range of visible light and transmitting light of wavelengths other than the reflected wavelength range, and which reflects the display light incident from the deflection unit towards a viewpoint of an observer; and a control unit which changes an incidence angle at which the display light from the deflection unit is incident on the narrow band reflection unit, in accordance with change in a wavelength of the light emitted from the light source, wherein the narrow band reflection unit is configured such that the reflected wavelength range changes when an incidence angle of light which is incident on the narrow band reflection unit changes, and the control unit changes the incidence angle such that a wavelength of the light emitted from the light source is included within the reflected wavelength range of the narrow band reflection unit.

These general and specific aspects may be implemented using a control apparatus and a mobile object, and any combination of control apparatuses and mobile objects.

BRIEF DESCRIPTION OF THE DRAWINGS

FIG. 15 is a diagram showing, in tabular format, an example of data relating to the diffusion direction which is held by an incidence angle determination unit.

FIG. 16 is a diagram showing, in tabular format, one example of a relationship between an angular difference between an incidence angle and a design incidence angle, and a wavelength shift amount.

FIGS. 27A and 27B are diagrams showing an example of the composition of an HMD according to a second embodiment of the present disclosure.

FIG. 28 shows an example of a conventional HUD.

DETAILED DESCRIPTION

Below, an embodiment of the present disclosure is described with reference to the drawings.

First Embodiment

Figure 1:
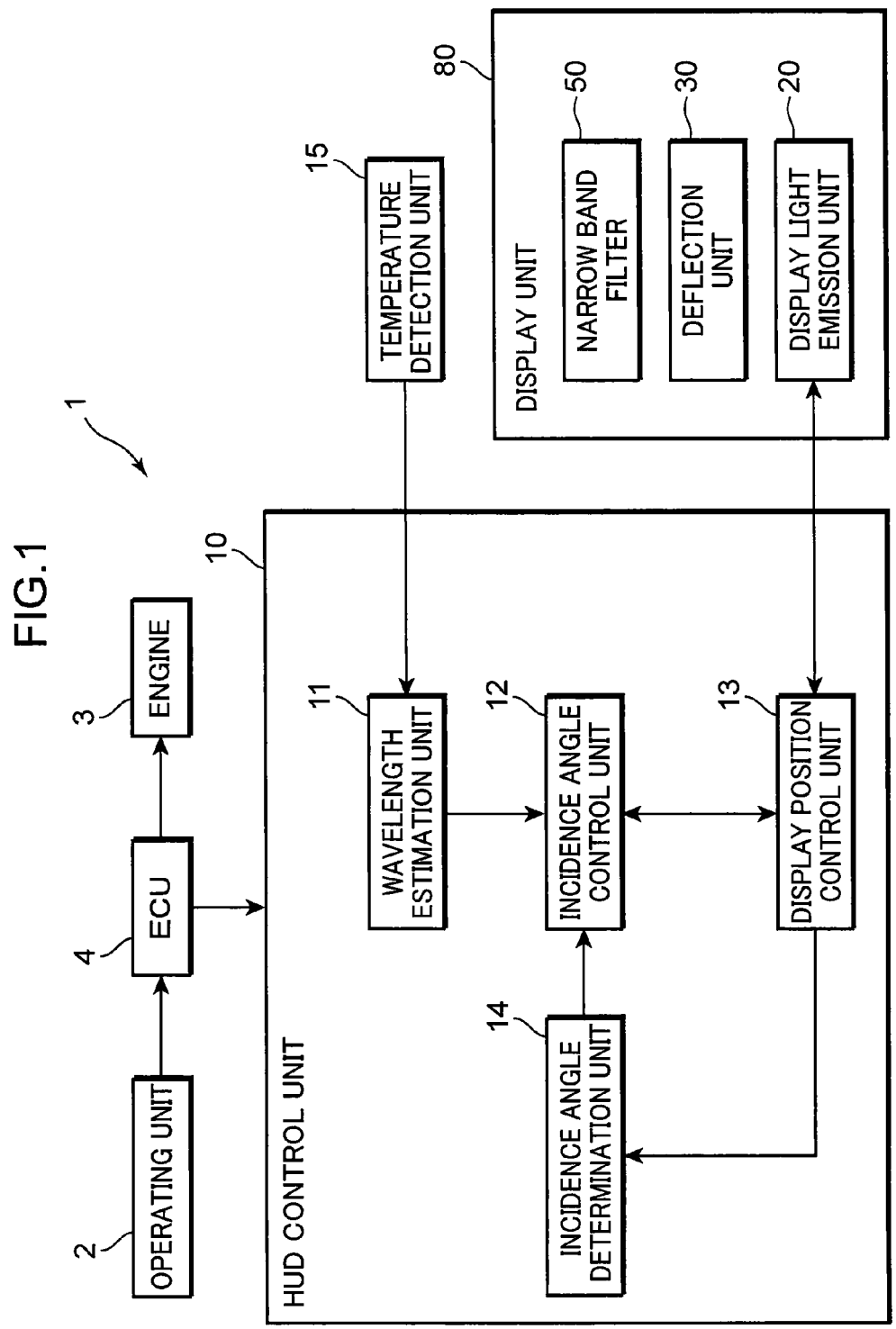
FIG. 1 is a functional block diagram showing a composition of a vehicle which is equipped with a head-up display (HUD) according to a first embodiment of the present disclosure.
Figure 2:
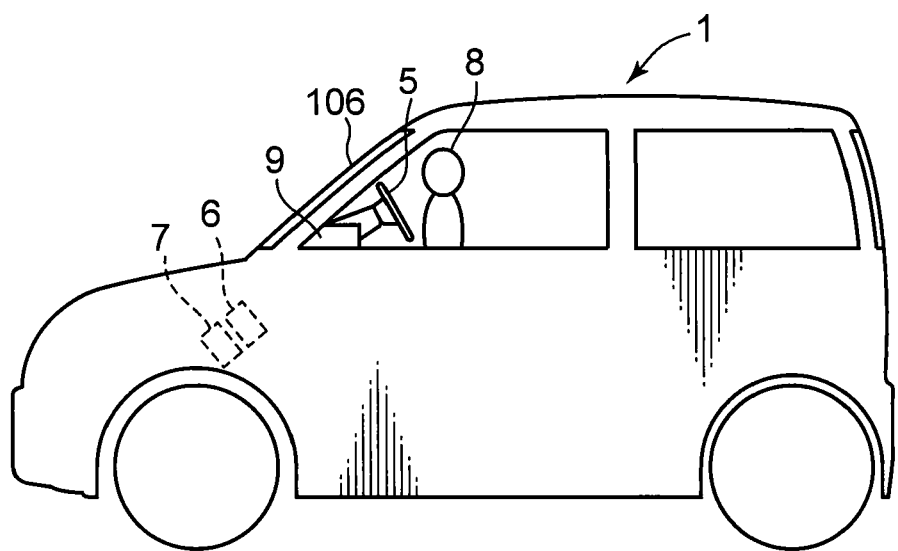
FIG. 2 is a diagram showing a schematic view of the vehicle.
Figure 3:
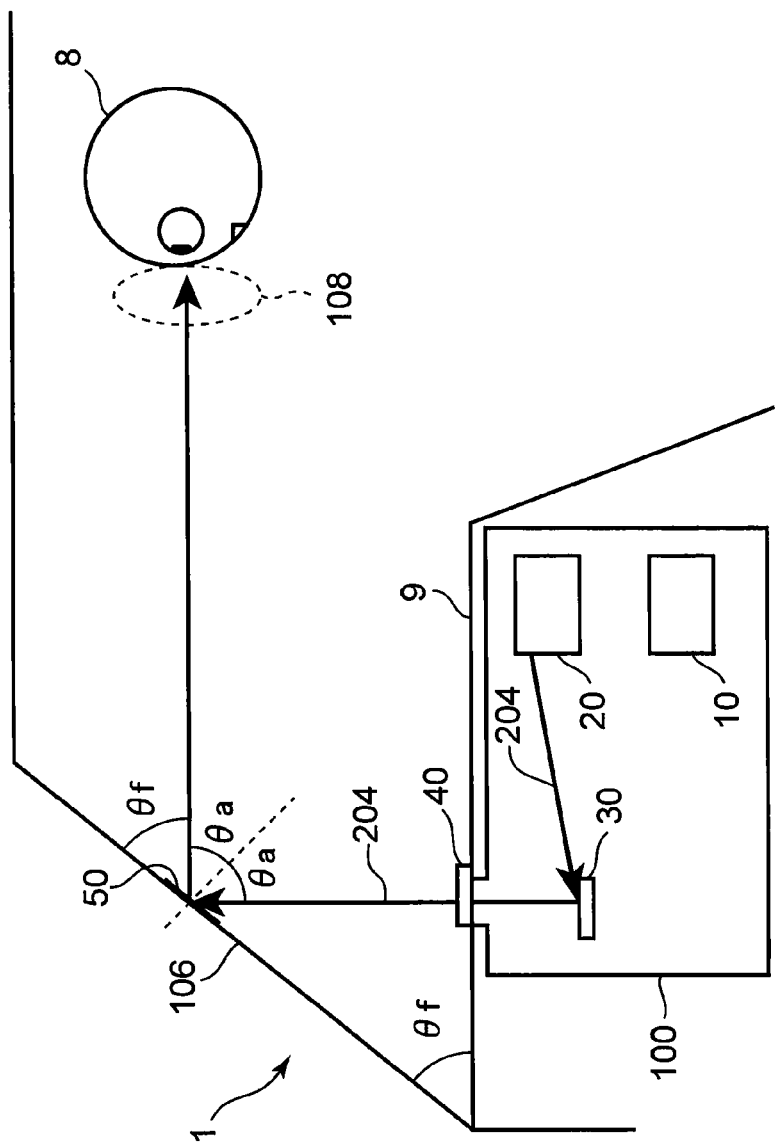
FIG. 3 is a diagram showing a schematic view of the composition of an HUD according to a first embodiment of the present disclosure.

FIG. 1 is a functional block diagram showing the composition of a vehicle which is equipped with a head-up display (HUD) according to a first embodiment of the present disclosure. FIG. 2 is a diagram showing a schematic view of the vehicle. FIG. 3 is a diagram showing a schematic view of the composition of an HUD according to a first embodiment of the present disclosure.

The vehicle 1 comprises an operating unit 2, an engine 3, an electronic control unit (ECU) 4, an HUD control unit 10, a temperature detection unit 15 and a display light emission unit 20. The operating unit 2 includes a steering wheel 5, a brake pedal 6, an accelerator pedal 7, and the like. The operating unit 2 outputs operational signals to the ECU 4 in accordance with the operations performed by a driver 8. The engine 3 generates drive force for moving the vehicle 1, in accordance with a control signal from the ECU 4. The ECU 4 performs overall control of the vehicle 1, for instance, to run the engine 3 in accordance with the operational signals from the operating unit 2. The ECU 4 outputs information that is to be displayed at the viewpoint of the driver 8 (for example, the speed of the vehicle 1), to the HUD control unit 10. As described previously, the eyebox 108 indicates a range in which an image can be seen by the driver 8, when the driver 8 moves his or her head. When the eyes of the driver 8 are in the eyebox 108, the display light (front surface reflected light 205) reaches the retina of the driver 8 and the driver 8 is able to view an image.

In FIG. 3, an HUD optical unit 100 is provided inside the dashboard 9 of the vehicle 1 which is equipped with an HUD. The HUD optical unit 100 is constituted by an HUD control unit 10, a display light emission unit 20, a deflection unit 30 and an optical system aperture section 40. The display light emission unit 20 emits display light corresponding to an image, such as driving information (a speedometer, map information), and the like, to the driver 8.

The HUD control unit 10 has a function for controlling the incidence angle of the display light 204 with respect to a narrow band filter 50, by controlling the display light 204 emitted from the display light emission unit 20. The display light emission unit 20 includes a light source, and forms an image using light emitted from the light source, so as to emit display light 204 which corresponds to the formed image. The deflection unit 30 deflects the display light 204 emitted from the display light emission unit 20. The narrow band filter 50 has properties of reflecting only light in a partial reflected wavelength range out of the wavelength range of visible light, and transmitting light of wavelengths other than the reflected wavelength range. The narrow band filter 50 reflects the display light 204 which is incident thereon from the deflection unit 30, towards the eyebox 108 of the driver 8. The narrow band filter 50 is configured such that the reflected wavelength range changes when the incidence angle of the light incident on the narrow band filter 50 changes. The HUD control unit 10 changes the incidence angle of the display light 204 with respect to the narrow band filter 50 so that the wavelength of the light emitted from the light source comes within the reflected wavelength range of the narrow band filter 50. The display light emission unit 20, the deflection unit 30 and the narrow band filter 50 constitute a display unit 80. The HUD control unit 10 includes a wavelength estimation unit 11, an incidence angle control unit 12, a display position control unit 13 and an incidence angle determination unit 14, and carries out processing for resolving a double image problem. The respective parts of the HUD control unit 10, and the temperature detection unit 15, the display light emission unit 20, the deflection unit 30 and the narrow band filter 50 are described in detail hereinafter.

In the present embodiment, the eyebox 108 of the driver 8 corresponds to one example of an observer's viewpoint, the narrow band filter 50 corresponds to one example of a narrow band reflection unit, and the HUD control unit 10 corresponds to one example of a control unit. Furthermore, the vehicle 1 corresponds to one example of a mobile object, the engine 3 corresponds to one example of a drive source, the ECU 4 corresponds to one example of a drive control unit and the driver 8 corresponds to one example of an observer. Moreover, the HUD optical unit 100 and the narrow band filter 50 correspond to one example of a display apparatus. Furthermore, the display light emission unit 20, the deflection unit 30 and the narrow band filter 50 which constitute the display unit 80 correspond to one example of an image display unit. Moreover, the HUD control unit 10 corresponds to one example of a second control unit.

Figure 4:
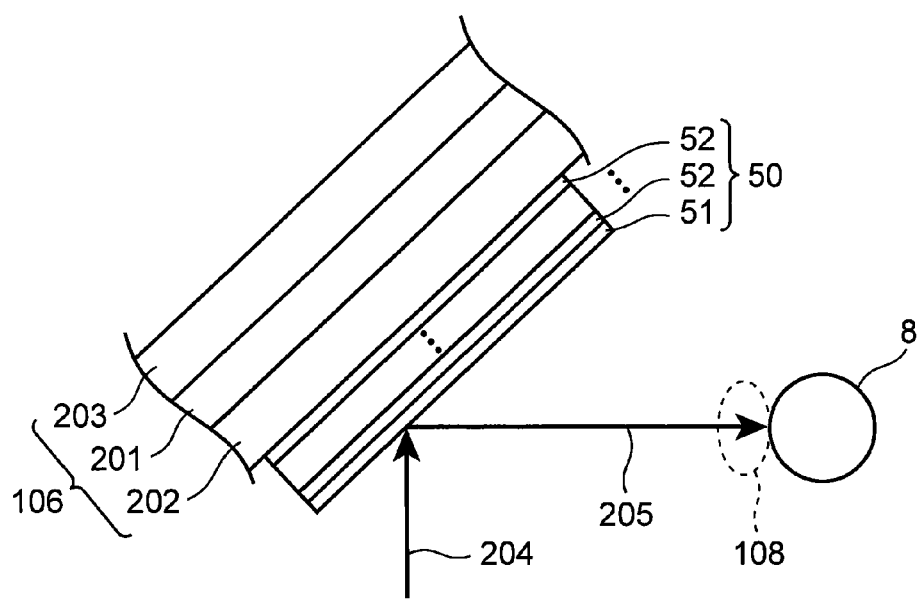
FIG. 4 is a diagram illustrating an example of the composition of a narrow band filter.
Figure 5:
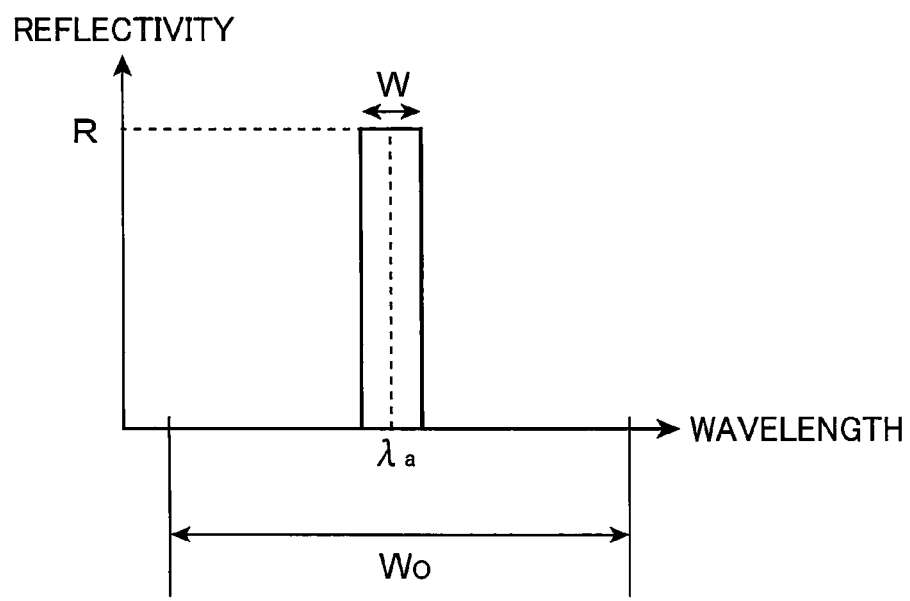
FIG. 5 is a diagram illustrating an example of the reflective properties of a narrow band filter.
Figure 6:
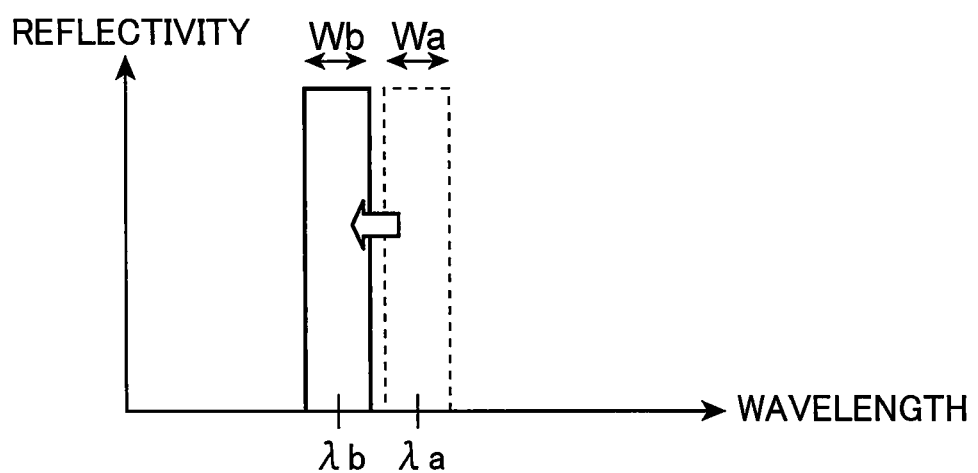
FIG. 6 is a diagram illustrating change (wavelength shift) in the reflective properties of a narrow band filter.

FIG. 4 is a diagram illustrating an example of the composition of a narrow band filter. FIG. 5 is a diagram illustrating an example of the reflective properties of a narrow band filter. FIG. 6 is a diagram illustrating change (wavelength shift) in the reflective properties of a narrow band filter. As shown in FIG. 4, the windshield 106 includes an inner glass 202, an outer glass 203, and an intermediate film 201 which is provided between the inner glass 202 and the outer glass 203 and which bonds the inner glass 202 and the outer glass 203.

Figure 7:
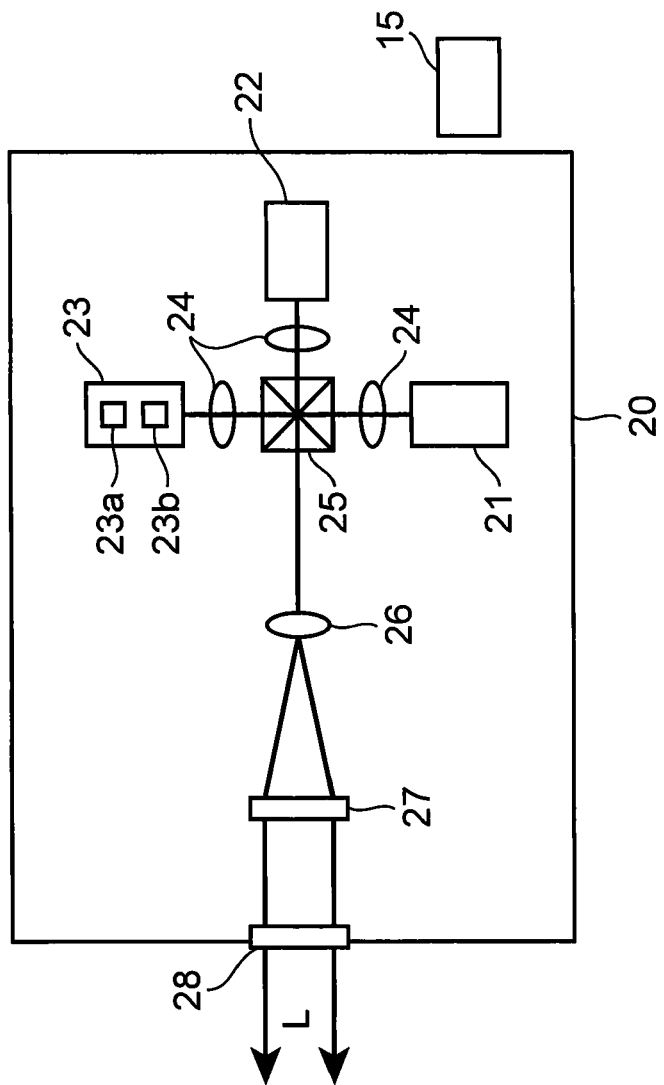
FIG. 7 is a diagram showing an example of the composition of a display light emission unit according to a first embodiment of the present disclosure.
Figure 35:
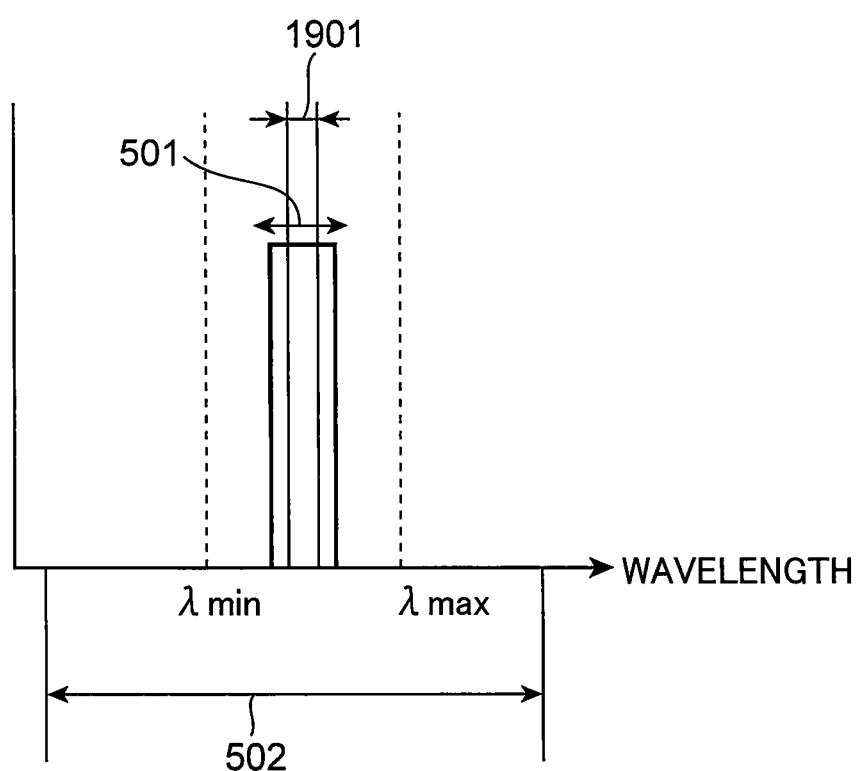
FIG. 35 is a diagram showing a case where the wavelength range of a laser light source at a certain temperature comes within the reflected wavelength range of the narrow band filter.
Figure 36:
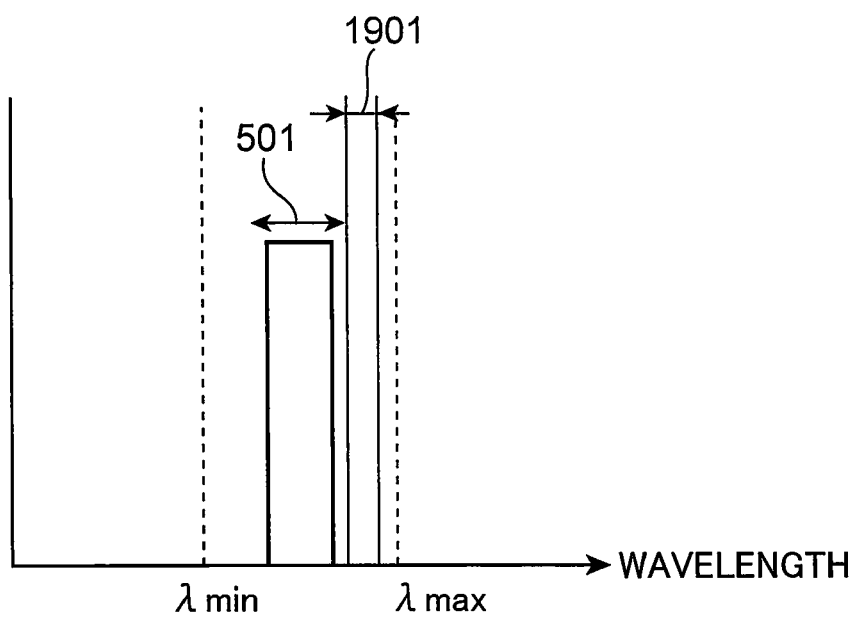
FIG. 36 is a diagram showing a case where the wavelength range of light output by a laser light source lies outside the reflected wavelength range of the narrow band filter.

In order to resolve the double image problem described above, the narrow band filter 50 having the composition shown in FIG. 4 is provided on the front surface of the interior side of the inner glass 202 of the windshield 106. The narrow band filter 50 provided on the windshield 106 reflects light from the deflection unit 30 toward the driver 8. The narrow band filter 50 is designed so as to reflect the light included in the specific reflected wavelength range W, of the visible light wavelength range W0, with a high reflectivity, in the light which is incident at the design incidence angle θa, as shown in FIG. 5. Furthermore, the reflected wavelength range W described above is designed so as to include the linewidth (namely, the wavelength width at the specific temperature Ta) of the laser light sources 21 to 23 (FIG. 7). For example, when the linewidth of the light source wavelength is 2 nm, the reflected wavelength range W has a width of no less than 2 nm, which encompasses the output wavelength range 1901 (FIG. 35 above) of the light source at temperature Ta. Moreover, in the present embodiment, the narrow band filter 50 is constituted by a multi-layered film filter which is able to increase the reflectivity of the reflected wavelength range W only. As described hereinafter, the narrow band filter may be constituted by a rugate filter.

In the present embodiment, the specific temperature Ta is the average value of the minimum operating temperature of the light source Tmin and the maximum operating temperature of the light source Tmax shown in FIG. 24 (described hereinafter). Furthermore, as shown in FIG. 3, the design incidence angle θa is treated as the value obtained by subtracting θf from 90° (θa=90−θf), when the windshield 106 forms an angle of θf with respect to a horizontal line. However, it is also possible to set separate values, respectively. For instance, the specific temperature Ta may be the average operating temperature of the light source. In this case, it is possible to reduce the frequency of changing the incidence angle with respect to the narrow band filter 50.

The present embodiment describes an HUD which is capable of preventing the occurrence of a double image by utilizing the angular dependence of the narrow band filter 50, even if using a narrow band filter 50 which has a narrow width of the reflected wavelength range W.

Here, the angular dependence of the narrow band filter 50 indicates a property whereby the wavelength range of the light reflected by the narrow band filter 50 changes with the angle (incidence angle) of the light incident on the narrow band filter 50. In general, a multi-layered film filter or rugate filter which is used as the narrow band filter 50 is constituted by layering a low-refractive-index material 51 and a high-refractive-index material 52 as shown in FIG. 4. In this case, the greater the incidence angle with respect to the narrow band filter 50, the shorter the wavelength reflected by the narrow band filter 50. In other words, the narrow band filter 50 is configured so that the reflected wavelength range changes in the short wavelength direction when the incidence angle becomes larger, and the reflected wavelength range changes in the long wavelength direction when the incidence angle becomes smaller. An example of this is shown in FIG. 6. The reflected wavelength range Wa in FIG. 6 indicates the wavelength range of the light reflected by the narrow band filter 50, of the light which is incident at the incidence angle θa. Furthermore, the reflected wavelength range Wb in FIG. 6 indicates the wavelength range of the light reflected by the narrow band filter 50, of the light which is incident at the incidence angle θb. In FIG. 6, the wavelength λa is the central wavelength of the reflected wavelength range Wa and the wavelength μb is the central wavelength of the reflected wavelength range Wb. In this case, the incidence angle θb is greater than the incidence angle θa (θb>θa). This phenomenon whereby the wavelength reflected by the narrow band filter 50 changes with the incidence angle of the light which is incident on the narrow band filter 50 is called "wavelength shift" in the present specification.

In the first embodiment of the present disclosure, if the wavelength of the light emitted from the light source has varied due to change in the temperature of the light source, the phenomenon of wavelength shift is used to shift the wavelength of the reflected wavelength range by altering the incidence angle of the display light with respect to the narrow band filter 50, so that the reflected wavelength range of the narrow band filter 50 includes the light source wavelength (the wavelength of the light emitted from the light source). With this, even when using a light source in which the wavelength of the light changes with temperature, it is possible to solve the double image problem.

Below, a method of solving the double image problem which uses wavelength shift of the narrow band filter 50 will be described in detail.

FIG. 7 is a diagram showing an example of the composition of a display light emission unit. The display light emission unit 20 according to the present embodiment comprises a liquid crystal element 27 and a backlight light source. The HUD control unit 10 controls the various parts of the display light emission unit 20.

In the present embodiment, the display light emission unit 20 includes, as light sources, a red laser light source 21, a blue laser light source 22 and a green laser light source 23. The respective laser lights emitted from the red laser light source 21, the blue laser light source 22 and the green laser light source 23 pass through a collimator 24 and are combined at a dichroic mirror 25. A laser light of a desired color can be output by suitably adjusting the outputs from the laser light sources 21 to 23 of the respective colors. In FIG. 7, the red laser light source 21 is a red (R) semiconductor laser light source, the blue laser light source 22 is a blue B semiconductor laser light source, and the green laser light source 23 is a combination of an infrared semiconductor laser light source 23a and a SHG (Second-Harmonic Generation) element 23b which converts the infrared light to green. Alternatively, the green laser light source 23 may also be a green (G) semiconductor laser light source. As a further alternative, the light sources 21 to 23 may be a solid-state laser, a liquid laser, a gas laser or a light-emitting diode.

In FIG. 7, the laser light is modulated in the respective laser light sources 21 to 23. However, the means for modulating the light emitted from the laser light sources may be used in combination with the laser light sources to modulate the laser light.

The light from the laser light sources 21 to 23 is diffused by an illumination optical element 26 and is then irradiated onto the liquid crystal element 27, thereby forming display light L. The display light L from the liquid crystal element 27 is emitted from the display light emission unit 20 by further passing through a projecting lens 28. In the present embodiment, the semiconductor laser light source 23a corresponds to one example of a fundamental wave laser light source, the SHG element 23b corresponds to one example of a second harmonic generation element, and the liquid crystal element 27 corresponds to one example of a display element. Furthermore, the HUD control unit 10 corresponds to one example of a first control unit.

The temperature detection unit 15 detects the temperature of the laser light sources 21 to 23. By detecting the temperature of the light source, it is possible to estimate the wavelength, which changes in accordance with the temperature, of the laser light which is emitted from the light source. The temperature detection unit 15 may detect the temperature of all of the light sources, or may be provided as separate temperature detection units for each of the RGB light sources. In the latter case, the temperature of each light source can be detected more accurately.

In the present embodiment, a composition using a transmissive liquid crystal element 27 onto which a light source is irradiated from the rear surface was adopted. However, it is also possible to use a reflective type liquid crystal element. In this case, it is possible to improve the light use efficiency of the light source and the display light L from the display light emission unit 20 can be made brighter.

As shown in FIG. 3, the deflection unit 30 diffuses the display light 204 from the display light emission unit 20 toward the windshield 106, when the display light 204 is incident thereon. In the HUD according to the present embodiment, the driver 8 views an image which is formed on the deflection unit 30, via the windshield 106 (the narrow band filter 50). The deflection unit 30 is designed so as to have different diffusion characteristics at different positions on the deflection unit 30, as described below, in order to control the incidence angle of the display light 204 on the windshield 106 (the narrow band filter 50).

Figure 8:
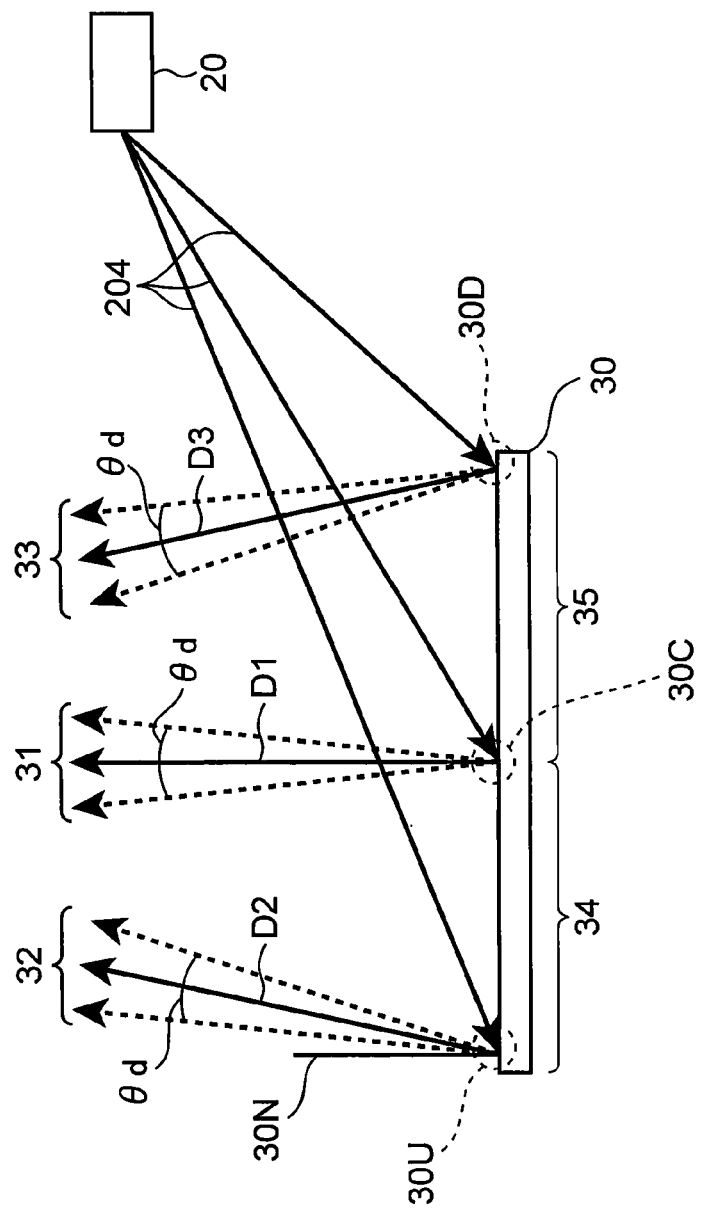
FIG. 8 is a diagram showing an example of the diffusion properties of a screen.
Figure 9A:
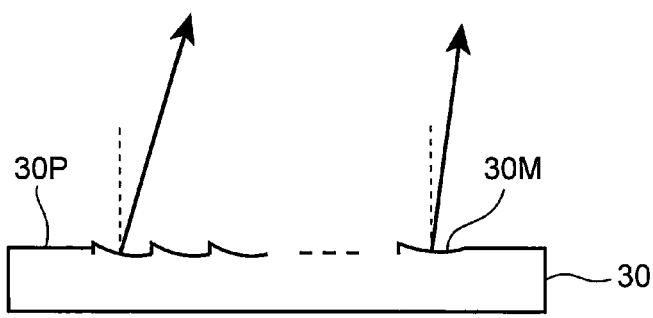
FIGS. 9A to 9C are diagrams showing the shape of a screen according to the first embodiment.
Figure 9B:
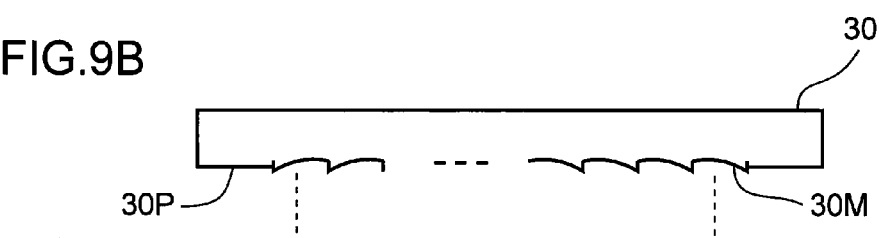
Figure 9C:
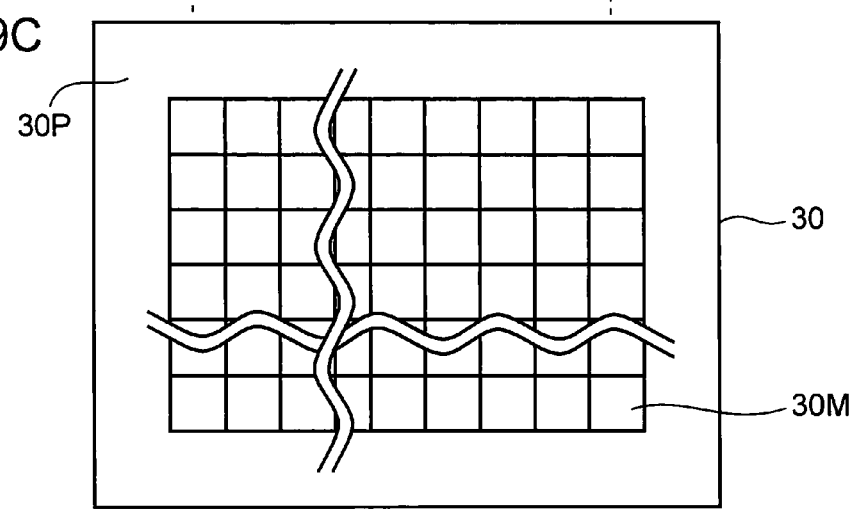

FIG. 8 is a diagram showing an example of the diffusion properties of the deflection unit 30. FIGS. 9A to 9C are diagrams showing the shape of the deflection unit 30 according to the first embodiment. FIG. 9A is a cross-sectional diagram of the deflection unit 30 in the vertical direction. FIG. 9B is a cross-sectional diagram of the deflection unit 30 in the horizontal direction. FIG. 9C is a front view of the deflection unit 30.

As shown in FIG. 8, the display light 204 projected from the display light emission unit 20 forms an image on the deflection unit 30, and this light is diffused at a uniform diffusion angle θd toward the windshield 106, and is incident on the narrow band filter 50 in the form of diffused light 31 to 33. In this case, the deflection unit 30 is designed such that the diffusion directions D1 to D3 of the display light 204 are different, depending on the projection position on the deflection unit 30. The solid arrows D1 to D3 of the diffused light 31 to 33 indicate light directed toward the center of the eyebox 108, of the diffused light 31 to 33 which are diffused from respective points on the deflection unit 30, and in the present embodiment, the direction of this light is the diffusion direction from the point (position) on the deflection unit 30.

In this example, the light which is incident on a central point 30C of the deflection unit 30 is diffused as a diffused light 31 centered in a direction D1 which coincides with the normal 30N to the deflection unit 30, as shown in FIG. 8. However, the light which is incident on one end portion 30U and another end portion 30D of the deflection unit 30 is respectively diffused at an inclination with respect to the normal 30N (the diffused light 32, 33 shown in FIG. 8). Consequently, the incidence angle on the narrow band filter 50 differs between light which is incident at the central point 30C of the deflection unit 30 and light which is incident at the one end portion 30U and the other end portion 30D of the deflection unit 30. By using a deflection unit 30 of this kind, it is possible to change the incidence angle of light from the deflection unit 30 on the windshield 106 (the narrow band filter 50), by altering the region on which the display light 204 from the display light emission unit 20 is projected. In the present embodiment, the incidence angle on the windshield 106 (the narrow band filter 50) is changed by altering the image display position on the deflection unit 30.

As shown in FIG. 9A, FIG. 9B and FIG. 9C, in the present embodiment, the deflection unit 30 is composed as a fly-eye mirror consisting of minute concave mirrors 30M. More specifically, as shown in FIG. 9C, the fly-eye mirror is constituted by arranging a plurality of concave mirrors 30M in a two-dimensional configuration. The concave mirrors 30M are arranged at an inclination with respect to the arrangement surface 30P of the fly-eye mirror. By using the fly-eye mirror as a deflection unit 30, it is possible to control the diffusion angle θd of the light which is diffused from the deflection unit 30, in accordance with the curvature of the minute concave mirrors 30M. Furthermore, as shown in FIG. 9A, the angle of inclination of the minute concave mirrors 30M changes with the position on the deflection unit 30. More specifically, the concave mirrors 30M are arranged so as to have different angles of inclination depending on the positions on the fly-eye minor. With this, it is possible to change the direction of diffusion of the light which is diffused at respective points on the deflection unit 30.

Here, the curvature of the concave mirrors 30M may be set so as to achieve a diffusion angle θd whereby the width of change in the reflected wavelength when the incidence angle of the display light 204 on the narrow band filter 50 is changed by the diffusion angle θd becomes smaller than the wavelength width of the reflected wavelength range W. According to this composition, it is possible to prevent the display light 204 from being transmitted through the narrow band filter 50, and the occurrence of a double image can be avoided.

It is also possible to use a reflective type hologram mirror having similar optical characteristics, rather than a fly-eye mirror, as the deflection unit 30. In this case, there is no need to perform fine processing in order to form the minute concave mirrors, and therefore a beneficial effect is obtained in that manufacturing becomes easier.

It is also possible to use a diffusion plate having a concave shape, rather than a fly-eye mirror, as the deflection unit 30. By forming the diffusion plate in a concave shape, it is possible to modify the direction of diffusion of the diffused light, in accordance with the position of the diffusion plate. In this case, it is not necessary to form minute concave minors, and therefore a beneficial effect is obtained in that manufacturing becomes easier.

Instead of using a fly-eye mirror as the deflection unit 30, it is also possible to use a method which achieves the diffusion characteristics of the deflection unit 30 by combined use of a micro lens array and a mirror.

In the present embodiment, for the purpose of simplicity, the reflective properties of the narrow band filter 50 are only exemplified in relation to the wavelength range of one color of the RGB laser light sources 21 to 23 (for example, the red laser light source 21), but the narrow band filter 50 has reflective properties and angular dependent characteristics in respect of each of the RGB laser light sources 21 to 23.

In the present embodiment, the narrow band filter 50 is achieved by a multi-layered film filter, but it is also possible to use a hologram, or the like, which has angular dependence. In this case, it is possible to set the output angle from the filter to a different value to the incidence angle, and hence increased freedom in the optical layout of the HUD can be achieved.

Figure 10:
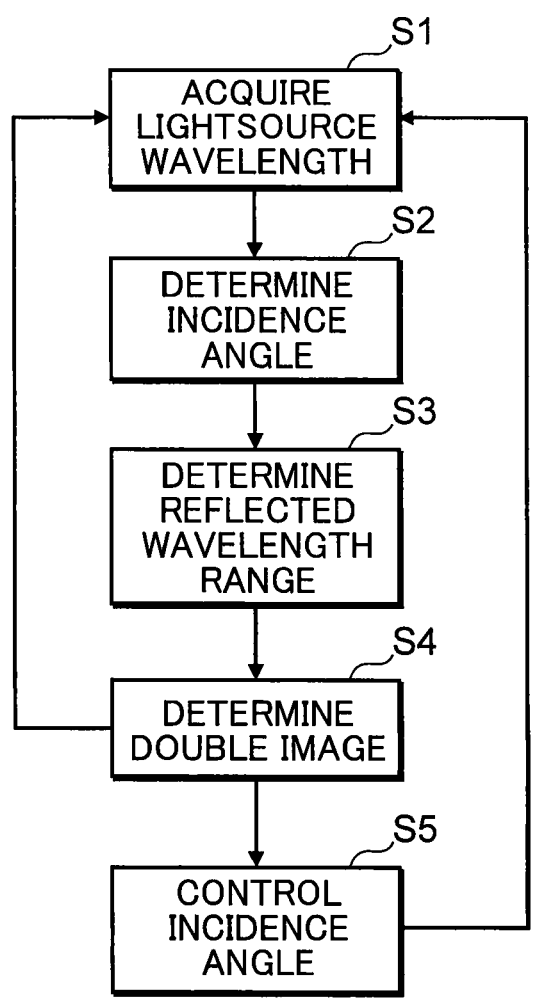
FIG. 10 is a flowchart showing an operational procedure of the first embodiment.

FIG. 10 is a flowchart showing an operational procedure of the first embodiment. Below, a specific procedure for resolving the double image problem will be described. The display apparatus according to the present embodiment prevents the occurrence of a double image by means of the HUD control unit 10 carrying out the processing in steps S1 to S5 shown in FIG. 10. Below, for the purpose of simplicity, an example is described in which the incidence angle at the narrow band filter 50 is controlled in order to respond to wavelength change in the light source in respect of the laser light of one color (R wavelength), of the laser lights of the RGB wavelengths emitted from the laser light sources 21 to 23.

[Step S1] (Estimation of Light Source Wavelength)

In this step S1, the wavelength estimation unit 11 estimates the wavelength of the light emitted from the light source (for example, the laser light source 21) included in the display light emission unit 20. The wavelength estimation unit 11 holds data indicating a relationship between the temperature and the wavelength of the light source, such as that shown in FIG. 24 which is described below, in a memory. The wavelength estimation unit 11 estimates the current light source wavelength (the wavelength of the light emitted from the light source), by acquiring the current light source temperature from the temperature detection unit 15, on the basis of the relationship shown in FIG. 24.

In the present embodiment, a method which determines the light source wavelength (the wavelength of the light emitted from the light source) on the basis of the light source temperature is used, but the method is not limited to this. Alternatively, it is also possible to use a method in which a wavelength detection unit for detecting the wavelength of the light, such as a spectrum analyzer, is provided, and the wavelength of the light emitted from the light source is measured directly. In this case, the wavelength of the light emitted from the light source can be measured more accurately. Furthermore, there is no need to provide a temperature detection unit 15.

The wavelength estimation unit 11 notifies the incidence angle control unit 12 of information about the estimated wavelength of the light emitted from the light source.

[Step S2] (Determining the Incidence Angle)

In this step S2, the incidence angle determination unit 14 determines the incidence angle of the display light 204 which is incident on the narrow band filter 50 from the deflection unit 30, by using information from the display position control unit 13. Here, the display position control unit 13 controls the position on the deflection unit 30 of the display light 204 which is projected from the display light emission unit 20.

In the present embodiment, the display position control unit 13 has a function of managing the position at which an image is displayed on the deflection unit 30. The display position control unit 13 controls the position at which the liquid crystal element 27 of the display light emission unit 20 shown in FIG. 7 displays an image.

Figure 11A:
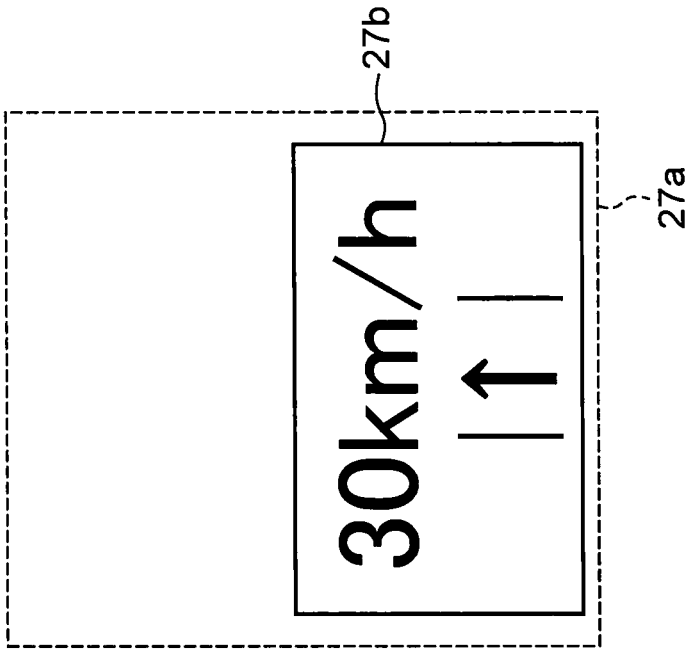
FIGS. 11A and 11B are diagrams showing an example of the display position of an image in a liquid crystal element.
Figure 11B:
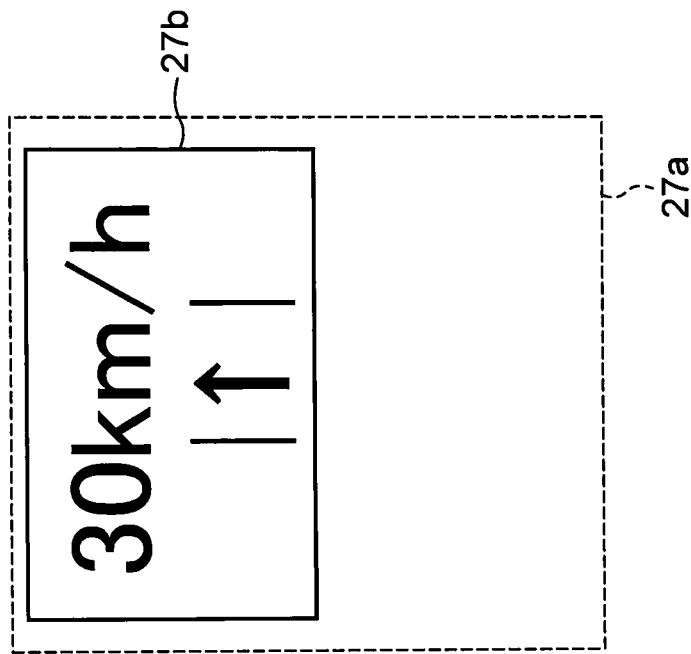

FIGS. 11A and 11B are diagrams showing an example of the display position of an image in the liquid crystal element 27. In FIG. 11A and FIG. 11B, the frame 27a shown by the dotted line indicates a region where an image can be displayed in the liquid crystal element 27 (liquid crystal display screen), and the frame 27b shown by the solid line indicates a region where the image is actually displayed. In the example shown in FIG. 11A, an image is displayed in the upper part of the liquid crystal display screen of the liquid crystal element 27. Similarly, in the example shown in FIG. 11B, an image is displayed in the lower part of the liquid crystal display screen of the liquid crystal element 27. In the present embodiment, the optical layout is designed such that the display light 204 from the display light emission unit 20 is irradiated onto the whole of the deflection unit 30. Therefore, it is possible to change the region in which the image is actually displayed on the deflection unit 30, by changing the display position of the image on the liquid crystal element 27, as described above. In this case, since there is no need to move optical components in order to change the display position of the image on the deflection unit 30, it is possible to achieve faster control.

Figure 12:
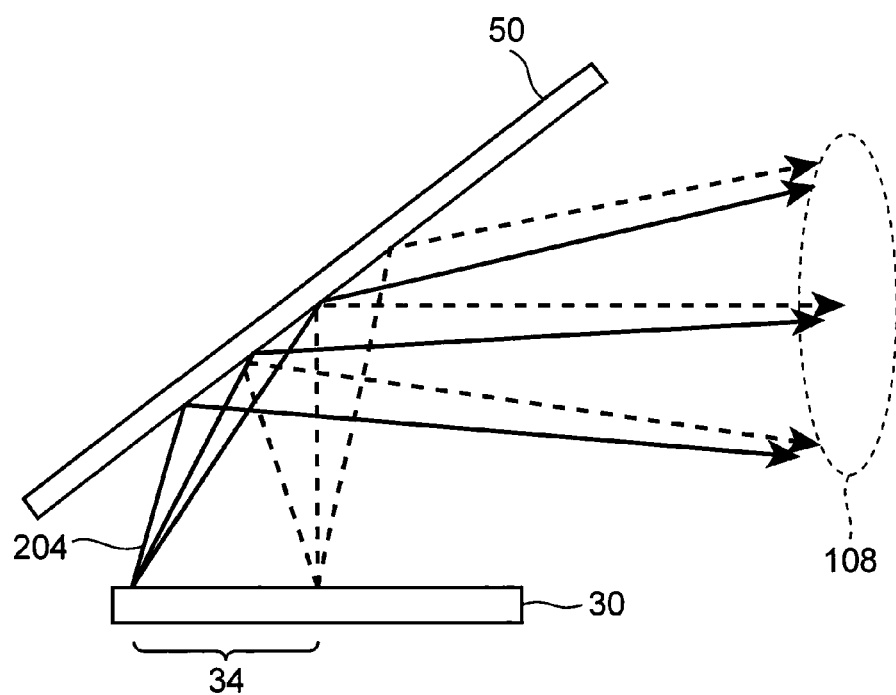
FIG. 12 is a diagram showing an example in which the incidence angle at the narrow band filter is changed by altering the image display position on a screen.
Figure 13:
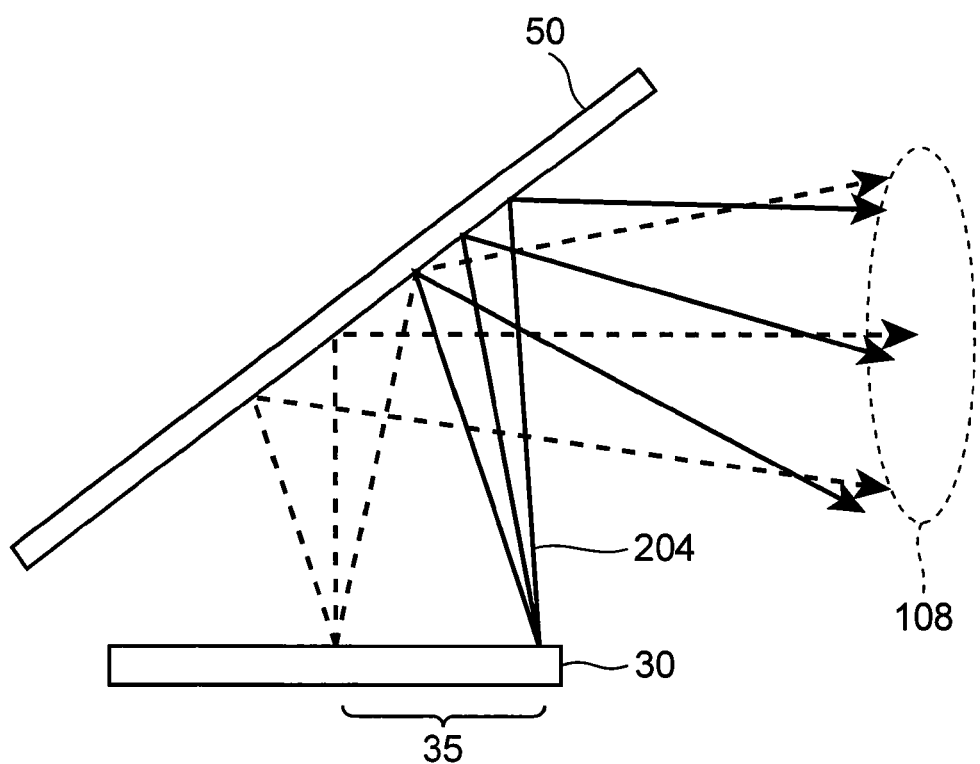
FIG. 13 is a diagram showing an example in which the incidence angle at the narrow band filter is changed by altering the image display position on a screen.

FIG. 12 and FIG. 13 are diagrams showing an example in which the incidence angle at the narrow band filter 50 is changed by altering the image display position on the deflection unit 30. FIG. 12 shows an example where an image is displayed in the upper region 34 of the deflection unit 30, where the display light 204 from the deflection unit 30 has a large incidence angle at the narrow band filter 50. FIG. 13 shows an example where an image is displayed in the lower region 35 of the deflection unit 30, where the display light 204 from the deflection unit 30 has a small incidence angle at the narrow band filter 50.

The incidence angle determination unit 14 determines the incidence angle of the display light 204 which is incident on the narrow band filter 50, from the information relating to the image display position on the deflection unit 30, which is held in the display position control unit 13. As shown in FIG. 8, the deflection unit 30 has different diffusion characteristics depending on the incident position of the display light 204 on the deflection unit 30. Therefore, the incidence angle determination unit 14 holds data relating to the diffusion characteristics (coordinates on the deflection unit 30, and the diffusion characteristics at that position, such as the diffusion angle $\theta d$ and the diffusion direction D1 to D3, etc.) of the deflection unit 30. The incidence angle determination unit 14 determines the incidence angle at the narrow band filter 50 of the display light 204 representing an image currently displayed on the deflection unit 30, from the current image display position as acquired from the display position control unit 13 and information relating to the optical layout (the inclination of the deflection unit 30, the slope of the windshield 106).

Figure 14:
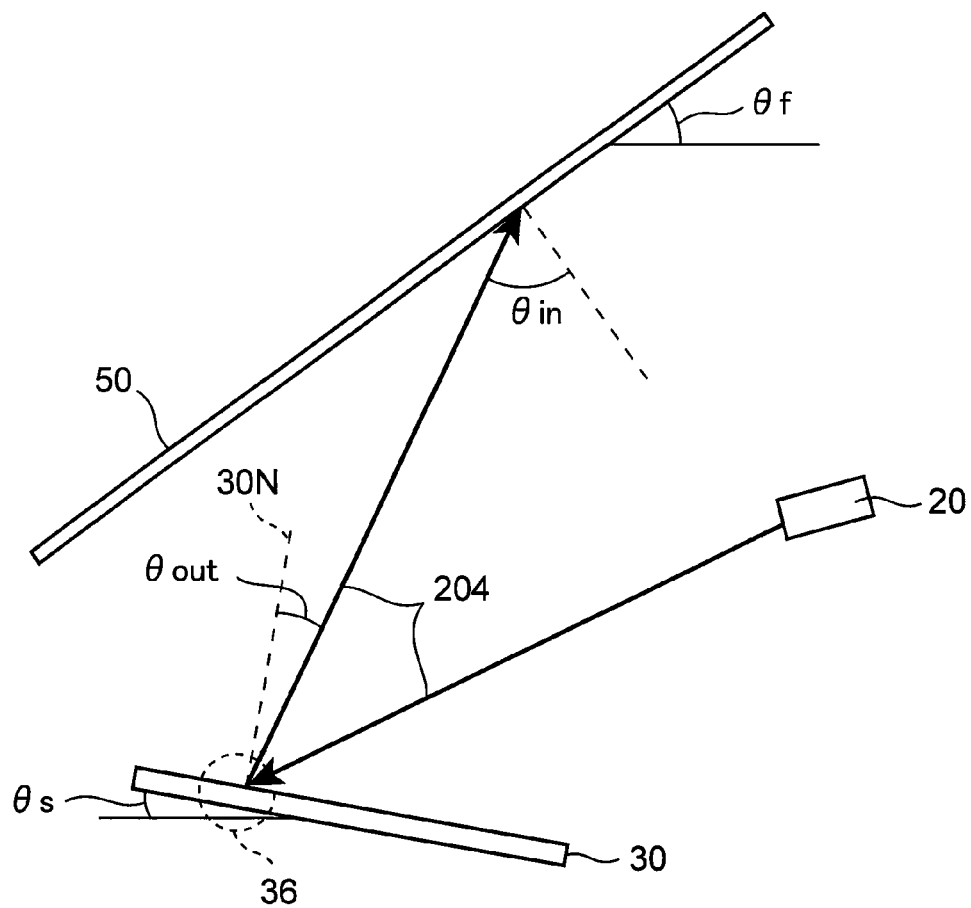
FIG. 14 is a diagram for describing a relationship between the diffusion from a point on a screen, the inclination of the screen, the inclination of a narrow band filter, and the incidence angle of the display light on the narrow band filter on a windshield according to the first embodiment.

FIG. 14 is a diagram for illustrating the relationship between the diffusion direction $\theta out$ from a point on the deflection unit 30, the inclination $\theta s$ of the deflection unit 30, the slope $\theta f$ of the windshield (the narrow band filter 50), and the incidence angle $\theta in$ of the display light 204 at the narrow band filter 50 on the windshield 106 according to the present embodiment. The incidence angle determination unit 14 determines the diffusion direction $\theta out$ in relation to the image display position 36 on the deflection unit 30 which is acquired from the display position control unit 13. Here, the diffusion direction $\theta out$ is the angle formed between the normal 30N to the deflection unit 30, and the diffused light (display light 204). The incidence angle determination unit 14 holds data relating to this diffusion direction $\theta out$, with respect to each point on the deflection unit 30.

FIG. 15 is a diagram showing, in tabular format, an example of data relating to the diffusion direction which is held by the incidence angle determination unit 14. In this example, the diffusion direction in the vertical direction is stated for each position in the vertical direction of the deflection unit 30. The incidence angle determination unit 14 also holds similar data for the horizontal direction, and determines the diffusion direction $\theta out$ of the diffused light using this data.

In the present embodiment, the incidence angle determination unit 14 holds data in a tabular format, as shown in FIG. 15, but the format of the data is not limited to this. Alternatively, the incidence angle determination unit 14 may use a method which calculates the diffusion direction successively using a function, on the basis of the coordinates position on the deflection unit 30. In this case, it is possible to calculate the diffusion direction in more detail.

The incidence angle $\theta in$ at which the diffused light (the display light 204) from the deflection unit 30 is incident on the narrow band filter 50 on the windshield 106 is calculated by adding the angle of inclination $\theta s$ of the deflection unit 30 shown in FIG. 14 and the angle of inclination $\theta f$ of the windshield (the narrow band filter 50), to the diffusion direction $\theta out$ of the diffused light. In other words, $$\theta in = \theta s + \theta f + \theta out.$$

In the present embodiment, in a case where the diffusion angle $\theta d$ (the angle formed between the dotted lines of the diffused light 31 to 33 shown in FIG. 8) of the diffused light from the deflection unit 30 is large, the light (the solid line arrows D1 to D3 of the diffused light 31 to 33) directed toward the center of the eyebox 108 from the points on the deflection unit 30 is used to determine the incidence angle of the light which is incident on the narrow band filter 50 from the deflection unit 30.

In determining the incidence angle $\theta in$, the incidence angle determination unit 14 may also use light other than the light which is directed at the center of the eyebox 108. For example, it is also possible to provide an eye camera which captures an image of the position of the eyes of the driver 8 in the vehicle, and for the incidence angle determination unit 14 to use light which is directed toward the position in the eyebox 108 where the eyes of the driver 8 are positioned, in determining the incidence angle. In this case, the incidence angle of the display light which is actually seen by the driver 8 can be determined more accurately. Furthermore, the incidence angle determination unit 14 may determine the diffusion direction $\theta out$ to be the direction of the central light in the light beam diffused from each point on the deflection unit 30.

Furthermore, if the diffusion characteristics vary within the region where the image is displayed (for example, if the diffusion direction D2 of the diffused light 32 in the upper part of the image differs from the diffusion direction D1 of the diffused light 31 in the lower part of the image, and the like, when an image is displayed on the whole of the region 34 in FIG. 8), the incidence angle determination unit 14 determines the incidence angle on the basis of the diffusion characteristics of the position on the deflection unit 30 where the central pixel of the display image is shown. In this case, it is possible to prevent the occurrence of a double image more accurately in the central of the screen, where important information is liable to be displayed.

If the diffusion characteristics vary within the region where the image is displayed, the incidence angle determination unit 14 may also determine the incidence angle on the basis of a position other than the position of the deflection unit 30 where the central pixel of the display image is displayed. For example, the incidence angle determination unit 14 may use the average value of the diffusion direction in the whole of the region where the image is displayed. Alternatively, the viewpoint of the driver 8 may also be measured by providing an eye camera, and the incidence angle determination unit 14 may determine the incidence angle on the basis of the diffusion characteristics of the position of the deflection unit 30 corresponding to the pixels seen by the driver 8.

The incidence angle determination unit 14 notifies the incidence angle control unit 12 of information relating to the determined incidence angle θin of the display light 204 at the narrow band filter 50.

[Step S3] (Determining the Reflected Wavelength Range)

In this step S3, the incidence angle control unit 12 calculates the effects of the wavelength shift on the basis of the value of the incidence angle θin of the display light 204 at the narrow band filter 50 notified at step S2 above by the incidence angle determination unit 14, and thus calculates the wavelength range (reflected wavelength range) of the light which is reflected by the narrow band filter 50.

The incidence angle control unit 12 has information about the reflected wavelength range of the narrow band filter 50 in relation to the design incidence angle θa (the reflected wavelength range W and the reflectivity R shown in FIG. 5) and information relating to wavelength shift in the narrow band filter 50. The incidence angle control unit 12 determines the current reflected wavelength range of the narrow band filter 50 on the basis of the incidence angle θin notified by the incidence angle determination unit 14 in the preceding step S2.

FIG. 16 is a diagram showing, in tabular format, one example of a relationship between the angular difference between the incidence angle θin and the design incidence angle θa, and the wavelength shift amount. In the present embodiment, the incidence angle control unit 12 holds a relationship between the angular difference between the incidence angle θin and the design incidence angle θa, and the wavelength shift amount shown in FIG. 16. For example, when the angular difference between the current incidence angle θin and the design incidence angle θa is 5 degrees, the incidence angle control unit 12 determines that the whole of the reflected wavelength range W of the narrow band filter 50 shown in FIG. 5 is shifted by 8 nm to the short wavelength side on the basis of the relationship in FIG. 16.

The wavelength shift amount may be calculated using a calculation formula which determines the wavelength shift amount of the narrow band filter 50, rather than a relationship table such as that shown in FIG. 16. Formula (3) is an example of a calculation formula for determining the wavelength shift amount of the narrow band filter 50. The incidence angle control unit 12 can determine the amount of wavelength shift by calculating the difference between the reflected wavelength $\lambda a$ at the design incidence angle θa and the reflected wavelength at the current incidence angle θin, using this Formula (3). By adopting this method, it is possible to calculate the amount of wavelength shift in more detail.

$$\lambda = \lambda 0 \times SQRT(1 - \sin^2\theta / Nb^2) \quad (3)$$

Here, θ is the incidence angle of the display light on the narrow band filter 50, $\lambda 0$ is the central wavelength of the reflected wavelength range W when the incidence angle θ=0, Nb is the average refractive index of the narrow band filter 50, and $\lambda$ is the central wavelength of the reflected wavelength range W at the incidence angle θ.

The incidence angle control unit 12 determines the presence or absence of a double image using the current numerical values of the reflected wavelength range thus calculated.

[Step S4] (Determining a Double Image)

In this step S4, the incidence angle control unit 12 determines the presence or absence of a double image by comparing the output wavelength of the light source (in other words, the wavelength of the light emitted from the laser light source 21 for instance) as determined in step S1 above, and the reflected wavelength range W of the narrow band filter 50 determined in step S3 above.

If the output wavelength of the light source (in other words, the wavelength of the light emitted from the light source) is within the current reflected wavelength range W of the narrow band filter 50 (in other words, in the state shown in FIG. 35 described above), all of the light from the light source is reflected by the narrow band filter 50 and a double image does not occur. Therefore, the incidence angle control unit 12 terminates processing and returns to the procedure in step S1.

When the output wavelength of the light source (in other words, the wavelength of the light emitted from the light source) is not within the current reflected wavelength range W of the narrow band filter 50, light in all or a portion of the wavelength range of the display light from the light source is not reflected by the narrow band filter 50 and therefore a double image occurs. In this case, the incidence angle control unit 12 carries out the processing in step S5 in order to implement a procedure for changing the incidence angle.

[Step S5] (Changing the Incidence Angle)

In this step S5, the incidence angle control unit 12 changes the incidence angle θin of the display light at the narrow band filter 50 in order that the output wavelength of the light source (in other words, the wavelength of the light emitted from the light source) is brought within the reflected wavelength range W of the narrow band filter 50.

The incidence angle control unit 12 determines the amount of wavelength error by calculating the difference between the maximum value of the output wavelength of the light source (in other words, the wavelength of the light emitted from the light source) and the maximum value of the reflected wavelength range W of the narrow band filter 50. In this step S5, processing is carried out to reduce the incidence angle θin at the narrow band filter 50 if the output wavelength of the light source is greater (longer) than the reflected wavelength range W of the narrow band filter 50, and to increase the incidence angle θin at the narrow band filter 50 if the output wavelength of the light source is smaller (shorter) than the reflected wavelength range W of the narrow band filter 50.

The wavelength width of the light emitted from the light source is the full width at half maximum of the wavelength profile of the light emitted from the light source, as described previously. Consequently, the maximum value of the output wavelength of the light source is the wavelength at the long wavelength end of the full width at half maximum. Furthermore, as stated above, the reflected wavelength range W of the narrow band filter 50 is a range of wavelengths showing a reflectivity of no less than 80% with respect to a peak reflectivity R. Consequently, the maximum value of the reflected wavelength range W is the wavelength at the long wavelength end of the wavelengths showing a reflectivity of no less than 80% with respect to the peak reflectivity R.

The incidence angle control unit 12 uses the data shown in FIG. 16 to specify the value of the incidence angle at which the amount of wavelength error and the amount of wavelength shift become equal. If the value of the wavelength error is −8 nm (in other words, if the maximum value of the output wavelength of the light source is 8 nm smaller than the maximum value of the reflected wavelength range W of the narrow band filter 50), the incidence angle control unit 12 sets the incidence angle to a value 5 degrees greater than the design incidence angle θa. The incidence angle control unit 12 notifies the display position control unit 13 of the incidence angle value thus determined as a corrected incidence angle θb.

The display position control unit 13 specifies the position on the deflection unit 30 where an image is to be displayed, from the information relating to the deflection unit 30 which is held in the display position control unit 13. If the corrected incidence angle θb notified from the incidence angle control unit 12 is 5 degrees larger than the current incidence angle, and the current image display position is the center of the deflection unit 30, the display position control unit 13 moves the image display position on the deflection unit 30 upwards by 5 mm on the basis of the data shown in FIG. 15, in order to increase the incidence angle by 5 degrees.

Figure 17:
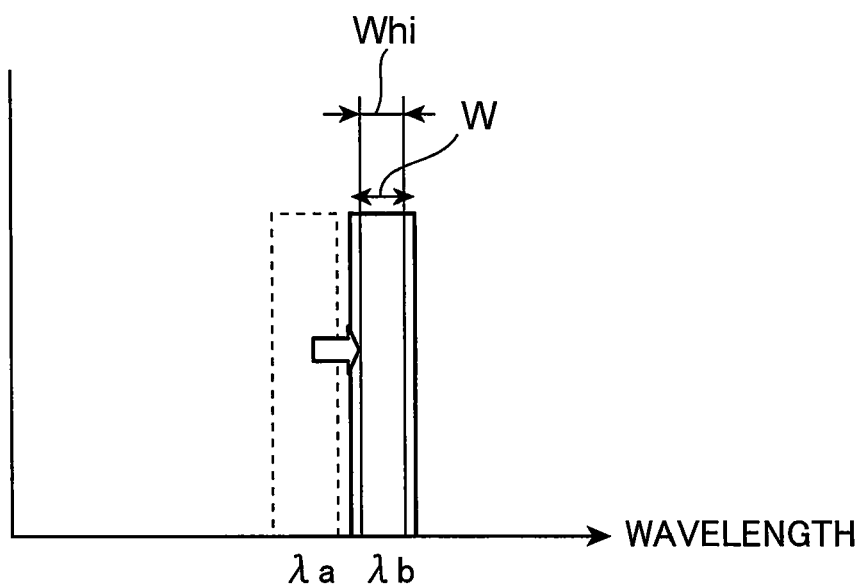
FIG. 17 is a diagram illustrating change in the reflected wavelength range caused by change in the incidence angle.
Figure 18:
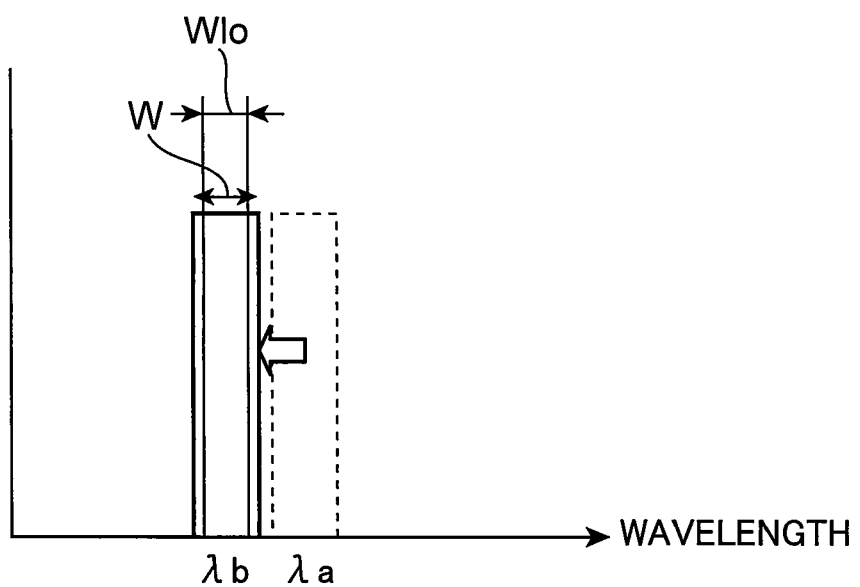
FIG. 18 is a diagram illustrating change in the reflected wavelength range caused by change in the incidence angle.

FIG. 17 and FIG. 18 are diagrams illustrating change in the reflected wavelength range caused by change in the incidence angle. FIG. 17 shows a case where the light source temperature is high, and FIG. 18 shows a case where the light source temperature is low. If the light source wavelength has changed to the long wavelength side in the case of a high temperature, it is possible to implement control to bring the light source wavelength range Whi within the reflected wavelength range W, as shown in FIG. 17, by reducing the incidence angle of the display light on the narrow band filter 50. Similarly, if the light source wavelength has changed to the short wavelength side in the case of a low temperature, it is possible to implement control to bring the light source wavelength range Wlo within the reflected wavelength range W, as shown in FIG. 18, by increasing the incidence angle of the display light on the narrow band filter 50.

When calculating the wavelength error, it is also possible to calculate a difference between the minimum value of the output wavelength of the light source and the minimum value of the reflected wavelength range W of the narrow band filter 50. Furthermore, it is also possible to adopt a method in which, if the output wavelength of the light source is shifted to the short wavelength side with respect to the reflected wavelength range W of the narrow band filter 50, the difference between the minimum value of the output wavelength of the light source and the minimum value of the reflected wavelength range W of the narrow band filter 50 is taken as the wavelength error, whereas if the output wavelength of the light source is shifted to the long wavelength side with respect to the reflected wavelength range W of the narrow band filter 50, the difference between the maximum value of the output wavelength of the light source and the maximum value of the reflected wavelength range of the narrow band filter 50 is taken as the wavelength error. In this case, it is possible to keep the wavelength error small, and the changes required in the incidence angle can be reduced.

In the present embodiment, the display light 204 from the deflection unit 30 is incident directly on the windshield 106 (the narrow band filter 50). However, it is also possible to adopt an embodiment in which a folding mirror is provided between the deflection unit 30 and the windshield 106 (the narrow band filter 50). In this case, it is possible to bend the light path of the optical system and the apparatus can readily be made more compact.

In the present embodiment, for the purpose of simplicity, the description relates to the example of changing the reflected wavelength range W of the narrow band filter 50 in respect of one of the RGB light sources 21 to 23, but similar processing may also be carried out for other wavelengths.

In the first embodiment described above, the display light emission unit 20 comprises a liquid crystal element 27. But the method of achieving the display light emission unit 20 may also employ a method which forms a display image by performing two-dimensional scanning of output light from a laser light source, by a scanning unit, instead of using a liquid crystal element. In this case, a beneficial effect is achieved that the display light emission unit 20 can be made more compact.

Figure 19:
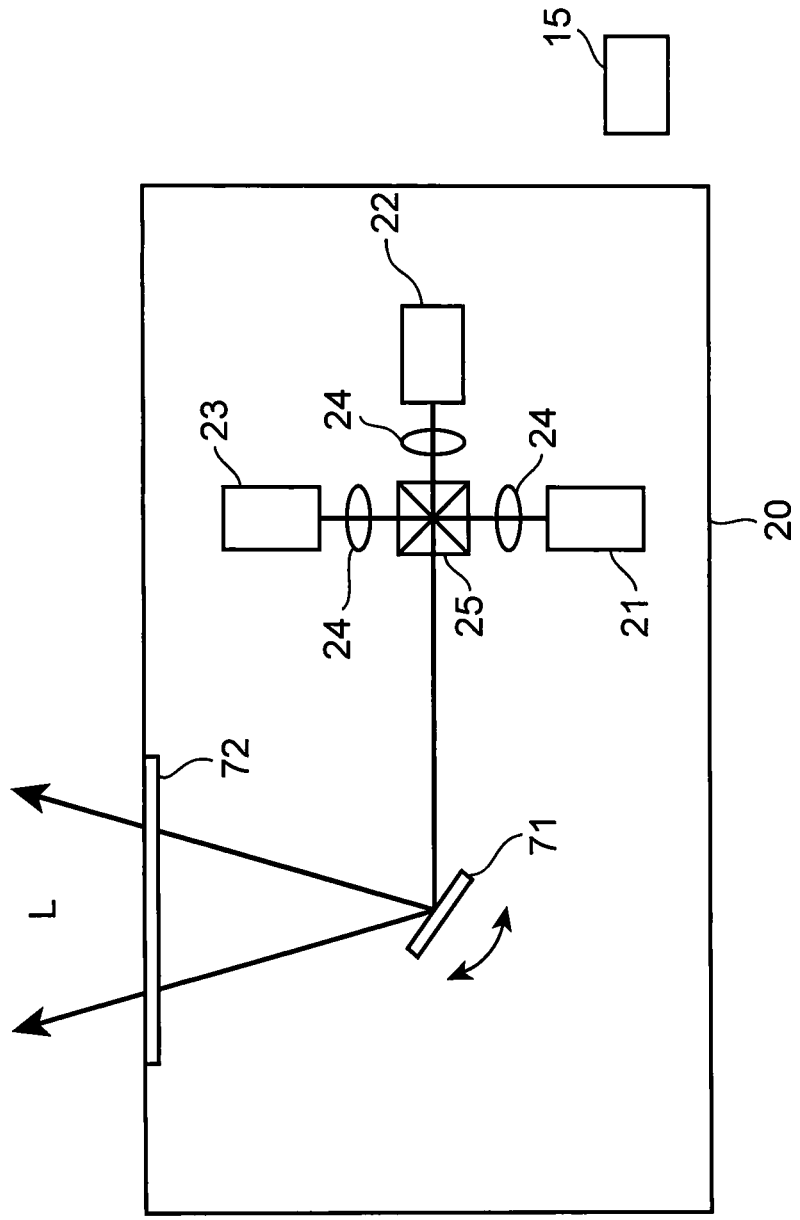
FIG. 19 is a diagram showing an example of a composition of a display unit when using a scanning unit.

FIG. 19 is a diagram showing an example of a composition of a display light emission unit 20 when using a scanning unit. The scanning unit 71 performs two-dimensional scanning of a beam from laser light sources 21 to 23, toward the aperture section 72. The scanning unit 71 is a small single plate-type mirror of which the angle can be deflected two-dimensionally, which is a MEMS (Micro-Electro-Mechanical-System) micro mirror. The laser light incident on the mirror is caused to scan two-dimensionally by oscillating the small single plate-type mirror in two orthogonal axial directions.

The scanning unit 71 may employ a method which performs a two-dimensional scanning action of laser light L by using a combination of two mirrors which are respectively oscillated in different one-dimensional directions, rather than a method which oscillates one mirror in two-dimensional directions. In this case, a beneficial effect is obtained in that the angles of each mirror can be controlled easily, since each mirror only oscillates in one-dimensional directions. The light from the scanning unit 71 passes through the aperture unit 72 and is output from the display light emission unit 20.

In the above first embodiment, the display position control unit 13 changes the image display position on the deflection unit 30 by altering the image display position on the liquid crystal element 27, but the display position control unit 13 may change the image display position on the deflection unit 30 by another method. For example, it is possible to employ a method in which a mechanism for changing the direction of the emitted light is provided in the display light emission unit 20, and the emission direction of the light from the display light emission unit 20 is changed in accordance with an instruction from the display position control unit 13. An example of this is illustrated in FIG. 20 and FIG. 21.

Figure 20:
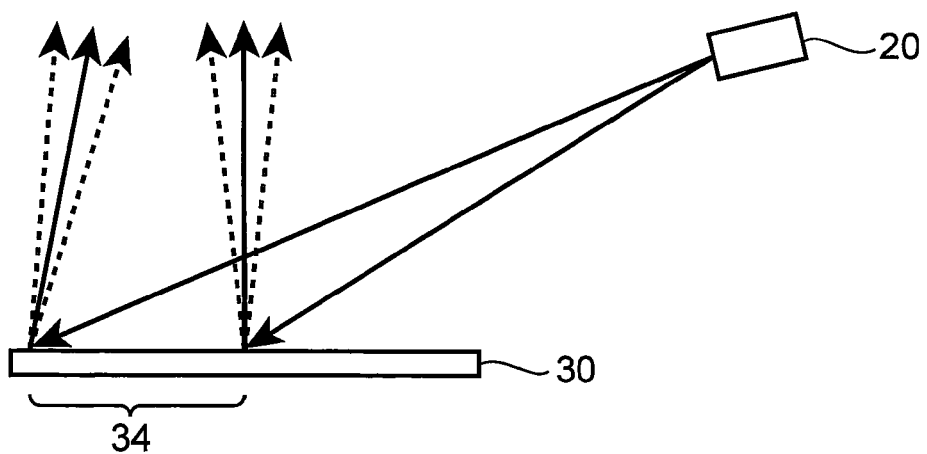
FIG. 20 is a diagram showing an example where a display unit projects display light onto a region on the upper side of a screen.
Figure 21:
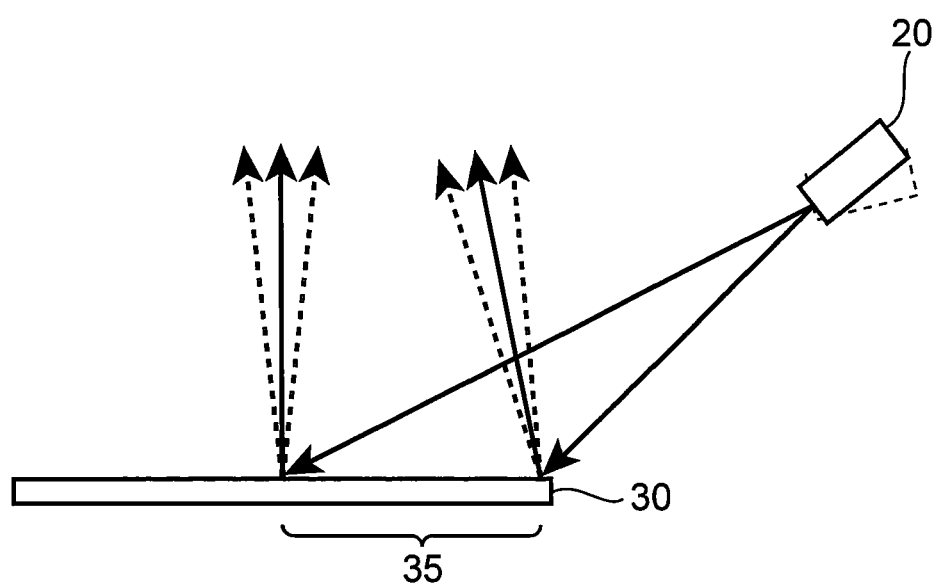
FIG. 21 is a diagram showing an example where display light is projected onto a region on the lower side of a screen, by altering the orientation of the display unit.

FIG. 20 is a diagram showing an example where the display light emission unit 20 projects display light onto a region 34 on the upper side of the deflection unit 30. FIG. 21 is a diagram showing an example where the display light is projected onto a region 35 on the lower side of the deflection unit 30, by altering the orientation of the display light emission unit 20. In this way, by providing a mechanism which changes the orientation of the display light emission unit 20, even if an image is displayed on the whole surface of the liquid crystal element 27, it is possible to deflect the display position on the deflection unit 30, and a display of higher quality can be achieved.

Figure 22:
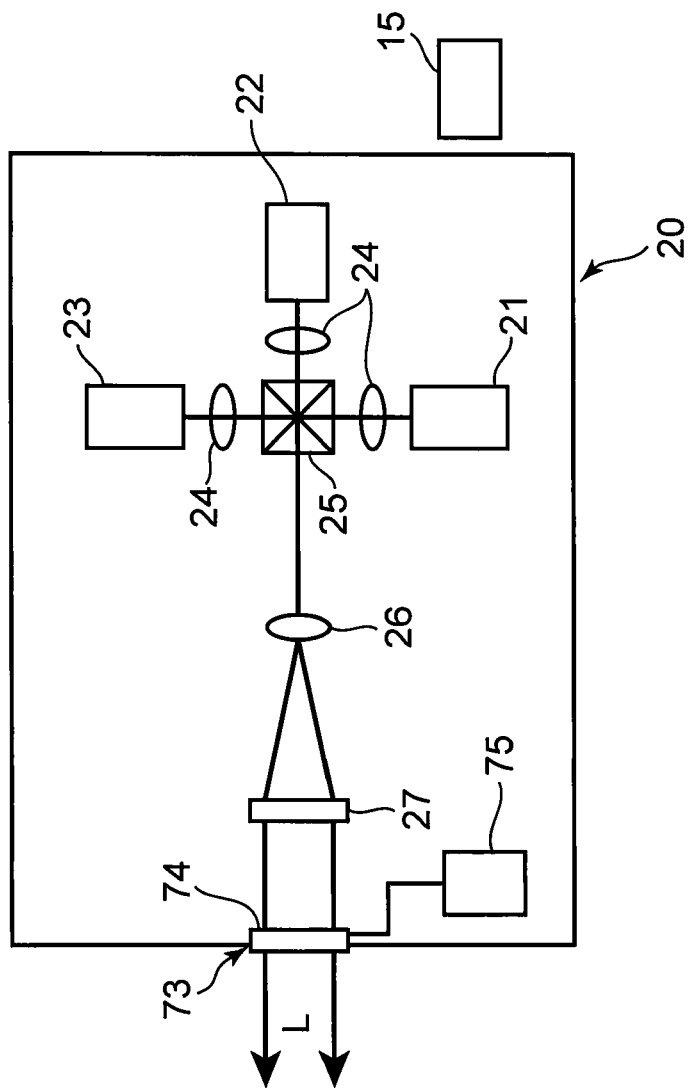
FIG. 22 is a diagram showing an example of the composition of a display unit which is equipped with a dynamic hologram element.

FIG. 22 is a diagram showing an example of the composition of a display light emission unit 20 which is equipped with a dynamic hologram element. As shown in FIG. 22, it is also possible to adopt a method in which a deflection element which alters the direction of the light is arranged in a portion of the display light emission unit 20 which emits the display light, rather than altering the orientation of the whole of the display light emission unit 20. In the example shown in FIG. 22, a dynamic hologram element 74 is arranged in the aperture section 73 of the display light emission unit 20, as one example of a deflection element. The dynamic hologram element 74 is an element which is formed by recording a diffraction grating on a liquid crystal element, is an element which can control the diffracting function by the presence or absence of an applied voltage. The drive unit 75 applies a voltage to the dynamic hologram element 74 on the basis of a control signal from the display position control unit 13. In the composition shown in FIG. 22, it is possible to change the display position of the image on the deflection unit 30, without using movable parts for altering the orientation of the display light emission unit 20. It is possible to use an electro-optical element, an acoustic-optical element, or the like, as the deflection element, instead of the dynamic hologram element 74.

In the first embodiment described above, the narrow band filter 50 may be achieved by providing three layers of narrow band filters which reflect only the respective wavelengths of the RGB laser light sources 21 to 23. Alternatively, it is also possible to use a narrow band filter 50 which deals simultaneously with the RGB wavelengths. In the former case, a beneficial effect is obtained in that it becomes easy to design a narrow band filter which corresponds to the temperature characteristics of the light sources 21 to 23. Below, examples of these compositions are described.

Figure 23:
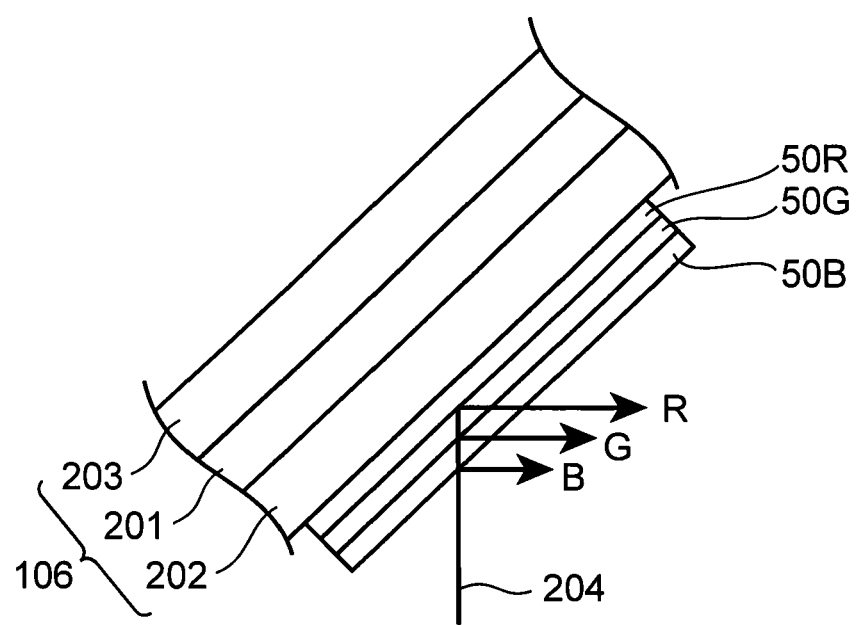
FIG. 23 is a diagram showing a schematic view of an example in which three narrow band filters are layered.
Figure 24A:
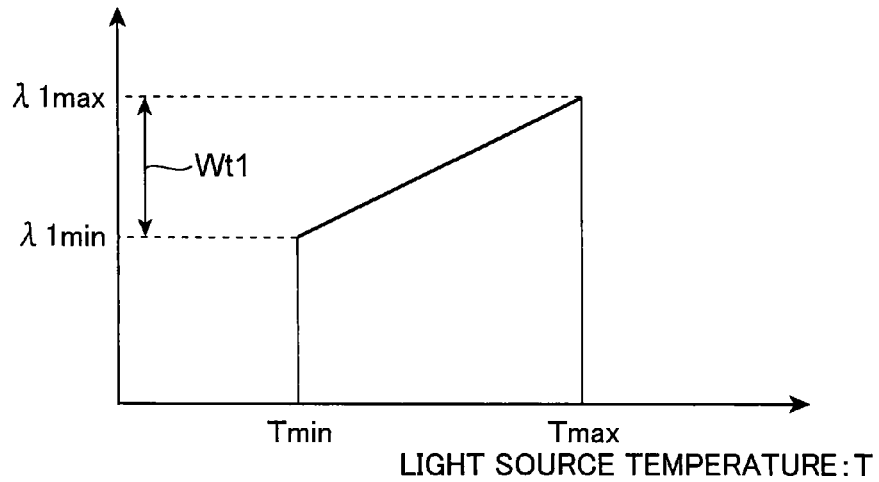
FIGS. 24A and 24B are diagrams showing an example of the temperature characteristics of the wavelength of laser light emitted from a laser light source.
Figure 24B:
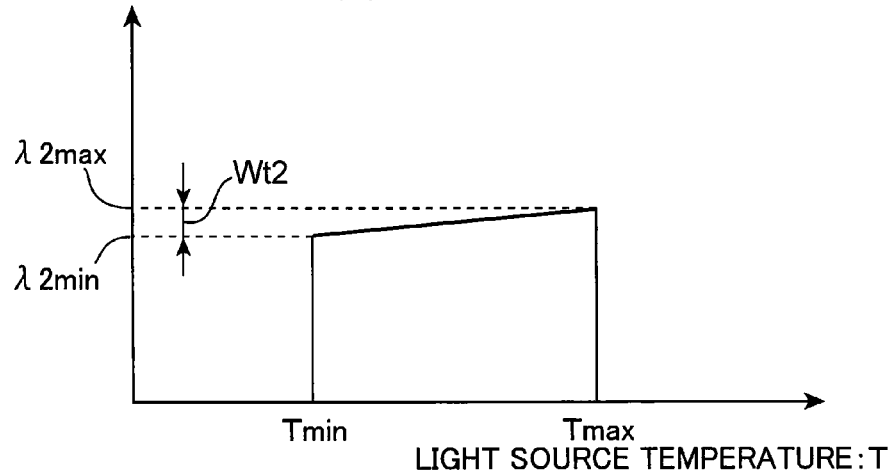
Figure 25:
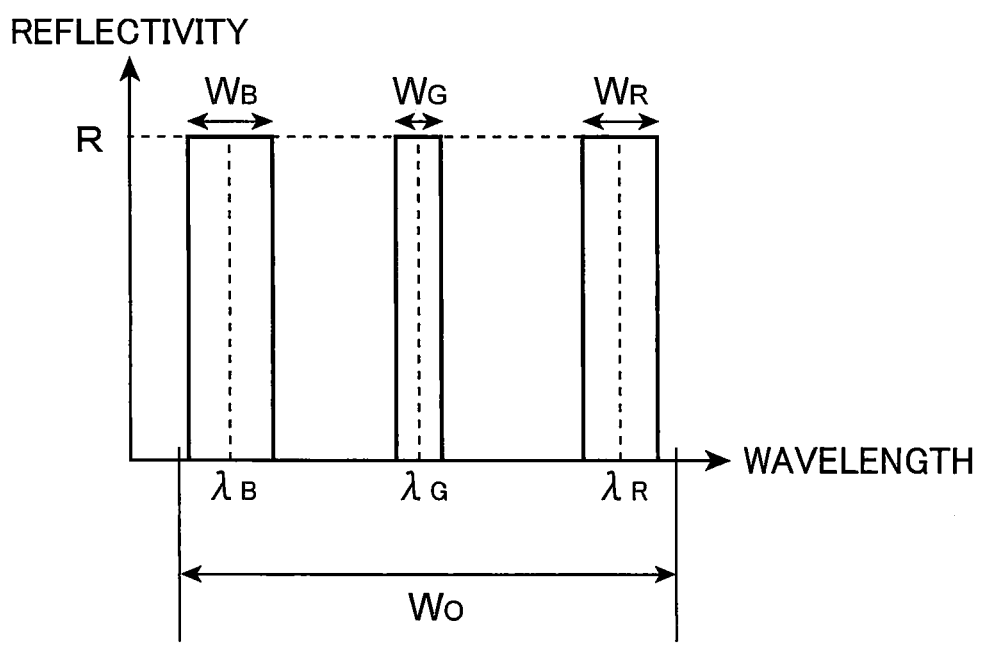
FIG. 25 is a diagram illustrating an example of the reflective properties of three narrow band filters.

FIG. 23 is a diagram showing a schematic view of an example in which three narrow band filters 50R, 50G, 50B are layered. FIGS. 24A and 24B are diagrams showing an example of the temperature characteristics of the wavelength of the laser light emitted from the laser light source. FIG. 24A shows the temperature characteristics of red and blue laser light sources 21, 22. FIG. 24B shows the temperature characteristics of a green laser light source 23 (FIG. 7) which comprises an infrared semiconductor laser 23a and an SHG element 23b. FIG. 25 is a diagram showing an example of the reflection characteristics of the three narrow band filters 50R, 50G, 50B.

In FIG. 23, the narrow band filter 50B is constituted by a multi-layered film filter which reflects blue light B from the blue laser light source 22 and transmits light of other wavelengths. The narrow band filter 50G is constituted by a multi-layered film filter which reflects green light G from the green laser light source 23 and transmits light of other wavelengths. The narrow band filter 50R is constituted by a multi-layered film filter which reflects red light R from the red laser light source 21 and transmits light of other wavelengths.

As shown in FIGS. 24A and 24B, the laser light sources 21 to 23 have respectively different temperature characteristics. In other words, in the red and blue laser light sources 21, 22, the wavelength changes to $\lambda 1min \leq \lambda \leq \lambda 1max$, in response to temperature change of $Tmin \leq T \leq Tmax$, and the temperature change range of the wavelength is Wt1, as shown in FIG. 24A. On the other hand, in the green laser light source 23 comprising an infrared semiconductor laser 23a and an SHG element 23b, as shown in FIG. 24B, the wavelength changes to $\lambda 2min \leq \lambda \leq \lambda 2max$, in response to temperature change of $Tmin \leq T \leq Tmax$, and the temperature change range of the wavelength is Wt2. Here, Wt1>Wt2, as shown in FIG. 24A and FIG. 24B. In other words, with similar change in the temperature, the amount of change in the light source wavelength of the green laser light source 23 is smaller than the amount of change of the light source wavelength of the red and blue laser light sources 21, 22.

Therefore, the narrow band filters 50R, 500, 50B are configured such that the reflected wavelength ranges WR, WG, WB satisfy WR>WG and WB>WG, as shown in FIG. 25. In other words, the amount of change of the light source wavelength with respect to temperature change in the green laser light source 23 is small compared to the amount of change of the light source wavelength with respect to temperature change in the red and blue laser light sources 21, 22, and therefore even if the reflected wavelength range WG has a small wavelength width, the wavelength is not liable to move outside this range and hence no problem arises. According to this composition, since the wavelength width of the reflected wavelength range WG is small, it is possible to restrict decline in the overall transmissivity of the layered narrow band filters 50R, 50G, 50B. Therefore, the driver 8 is able to see the outside world of the windshield 106 in a more favorable manner. The wavelength estimation unit 11 may respectively save, in a memory, data which indicates the relationships between the temperature and the wavelength of the light sources as shown in FIGS. 24A and 24B. In this embodiment, the red and blue laser light sources 21, 22 correspond to one example of a first laser light source, the green laser light source 23 corresponds to one example of a second laser light source, the reflected wavelength ranges WR, WB correspond to one example of a first reflected wavelength range, and the reflected wavelength range WG corresponds to one example of a second reflected wavelength range.

Moreover, the narrow band filters 50R, 50G, 50B may be configured respectively so as to have average refractive indices whereby the amounts of change of the reflected wavelength ranges WR, WG, WB with respect to change in the incidence angle at the narrow band filters 50R, 50G, 50B are substantially the same as each other. According to this composition, it is possible to make the amounts of change of the reflected wavelength ranges WR, WG, WB at the narrow band filters 50R, 50G, 50B substantially the same, by altering the incidence angle at the narrow band filter 50R of the display light using laser light from the red laser light source 21, the incidence angle at the narrow band filter 50B of the display light using laser light from the blue laser light source 22 and the incidence angle at the narrow band filter 50G of the display light using laser light from the green laser source 23, by the same amount by means of the incidence angle control unit 12. As a result of this, even if using respective laser light sources 21 to 23, it is possible to prevent the occurrence of a double image by changing the incidence angle at the narrow band filters 50R, 50G, 50B. In this embodiment, the red laser light source 21 corresponds to one example of a first laser light source, the blue laser light source 22 corresponds to one example of a second laser light source, the narrow band filter 50R corresponds to one example of a first multi-layered film filter, and the narrow band filter 50B corresponds to one example of a second multi-layered film filter.

Figure 26:
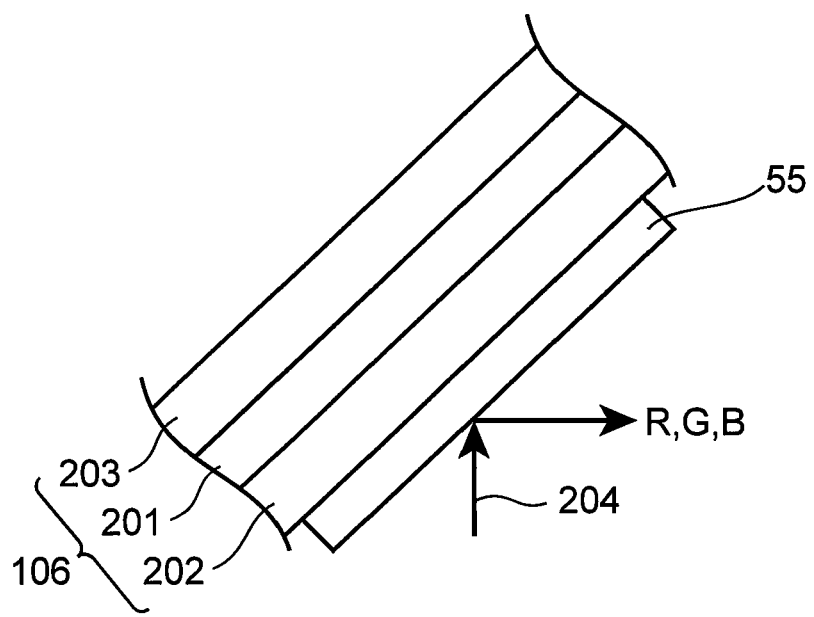
FIG. 26 is a diagram showing a schematic view of an example using a narrow band filter which deals simultaneously with RGB wavelengths.
Figure 29:
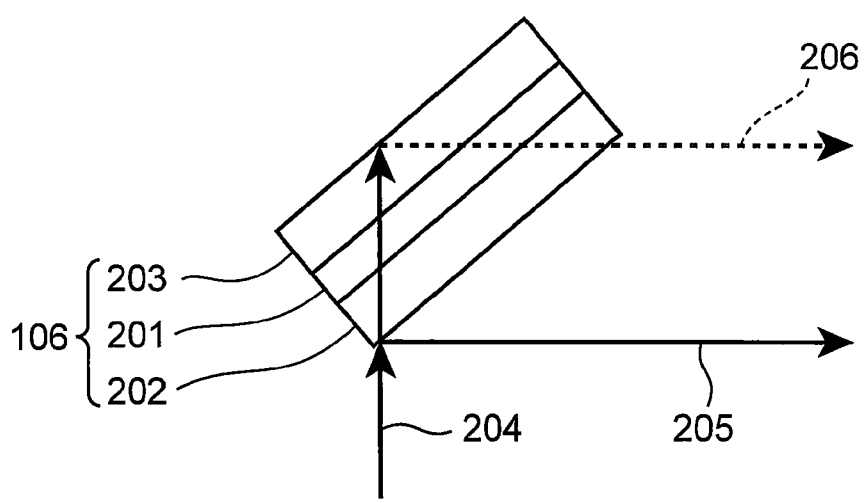
FIG. 29 is a diagram showing a composition of a windshield.
Figure 30:
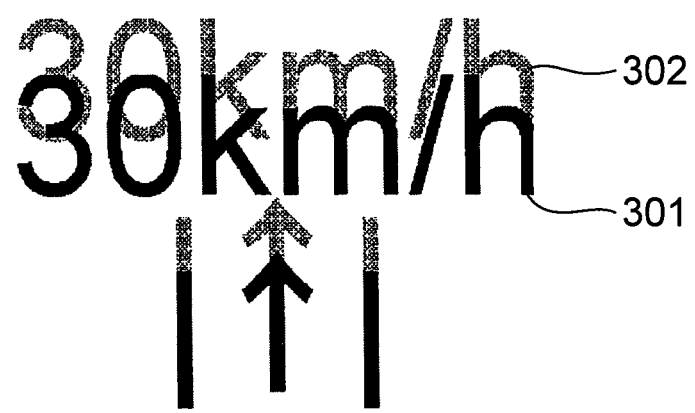
FIG. 30 is a diagram illustrating an example of a double image.
Figure 31:
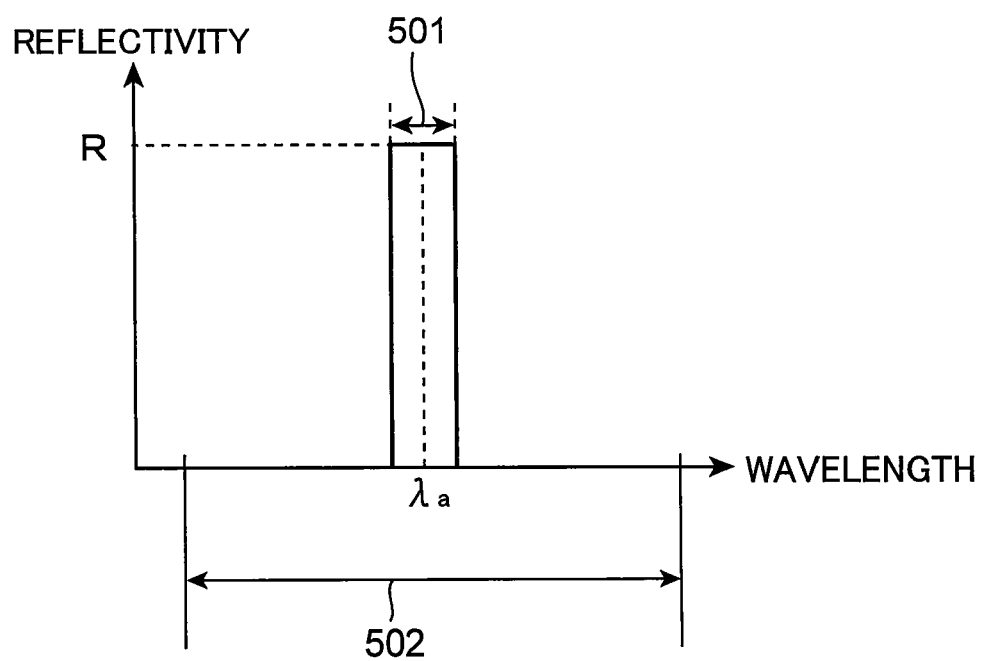
FIG. 31 is a diagram illustrating an example of the reflective properties of a narrow band filter.
Figure 32:
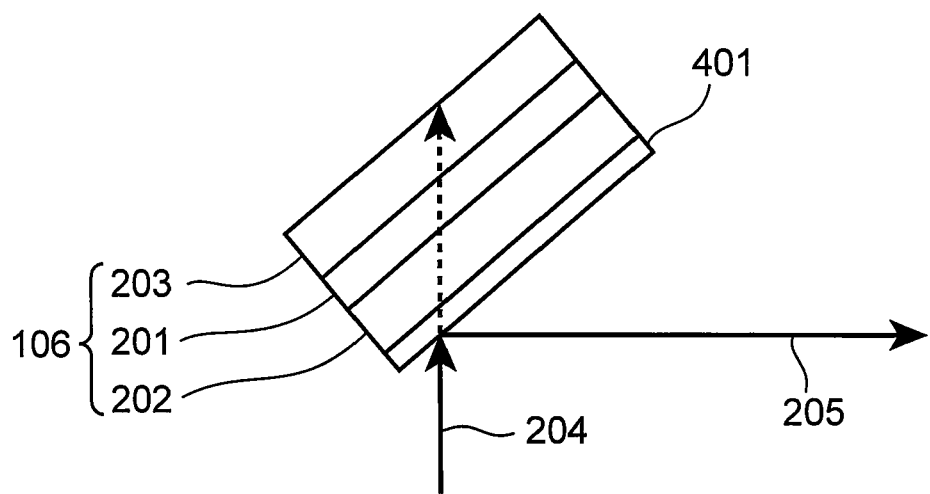
FIG. 32 shows an example of preventing the occurrence of a double image by using a narrow band filter.
Figure 33:
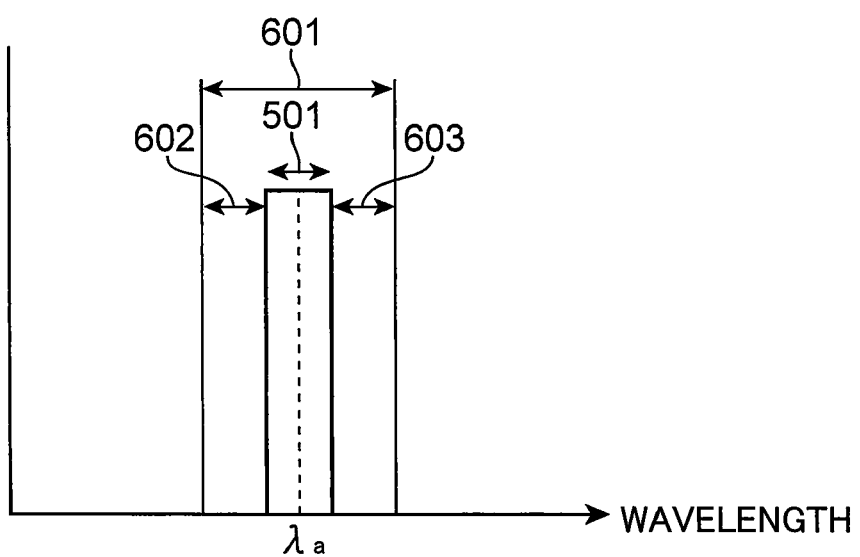
FIG. 33 is a diagram showing a case where the wavelength range of the light source is larger than the reflected wavelength range of the narrow band filter.
Figure 34:
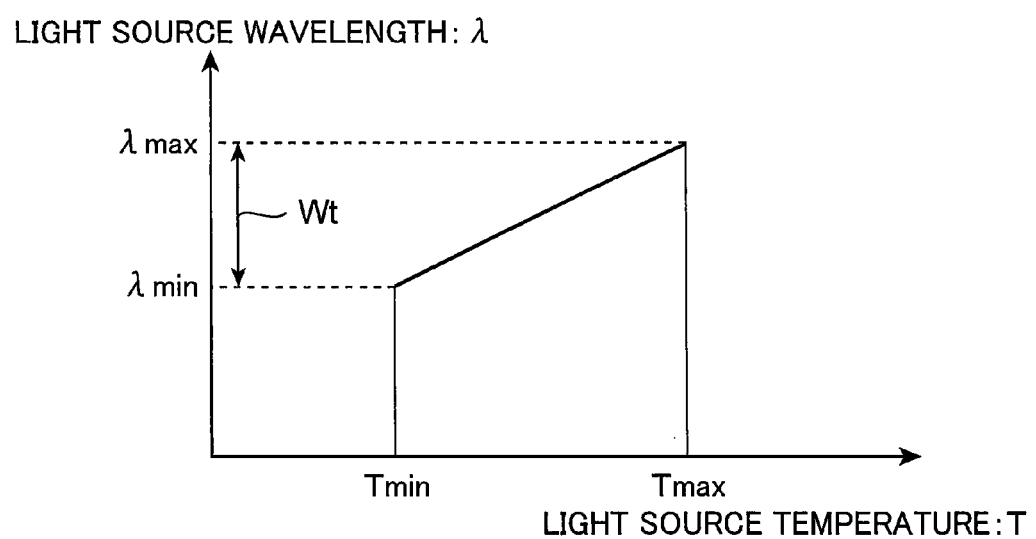
FIG. 34 is a diagram showing variation in the wavelength of laser light with temperature.

FIG. 26 is a diagram showing a schematic view of an example using a narrow band filter 55 which deals simultaneously with RGB wavelengths. This narrow band filter 55 is constituted by a rugate filter. The rugate filter is a commonly known filter which is configured such that the variation in the refractive index oscillates continuously between a high value and a low value. By using the rugate filter, it is possible to achieve a narrow band filter 55 which reflects only red light R, green light G and blue light B, and transmits light of other wavelength ranges.

In the above first embodiment, the HUD optical unit 100 is accommodated in the dashboard 9 of the vehicle 1. However, an exemplary embodiment is not limited to this. Alternatively, an embodiment may adopt a composition in which the HUD optical unit 100 can be installed optionally, after the vehicle 1 has been completed. In this case, for example, a composition is adopted in which the HUD optical unit 100 is disposed on the dashboard 9, the narrow band filter 50 is provided separately from the windshield 106, and the display light from the HUD optical unit 100 is reflected by the narrow band filter 50 and directed towards the viewpoint of the driver 8. Furthermore, the ECU 4 may be composed in advance so as to be able to communicate with an HUD control unit 10 which is installed optionally. Moreover, the HUD control unit 10 may be composed so as to be able to communicate with the ECU 4.

In the above first embodiment, the wavelength estimation unit 11 respectively saves, in a memory, data which indicates the relationships between the temperature and the wavelength of the light sources as shown in FIGS. 24A and 24B. In general, a laser light source has individual variations in the wavelength of the laser light which is emitted. Therefore, when dispatched from the factory, a correction value may be stored in a memory of the wavelength estimation unit 11, and the data indicating the relationship between the temperature and the wavelength of the light source as shown in FIGS. 24A and 24B may be corrected on the basis of this correction value.

Second Embodiment

The present embodiment describes an HMD which is capable of preventing the occurrence of a double image by utilizing the angular dependence of a narrow band filter, even if using a narrow band filter which has a narrow reflected wavelength range.

FIGS. 27A and 27B are diagrams showing the composition of the display apparatus according to this embodiment; FIG. 27A is a plan view and FIG. 27B is a side view. The constituent elements which are the same as the first embodiment are labeled with the same reference numerals and description thereof is omitted here.

61 denotes an eyeglass frame which is a main body of a display apparatus in the present embodiment. The display light emission unit 20, the deflection unit 30, the HUD control unit 10 and the temperature detection unit 15 are arranged in the side of the eyeglass frame 61. Due to this shape, it becomes unnecessary to provide a large optical system and mechanism in front of the user's eyes, as in a conventional HMD, and the external appearance of the display apparatus can be improved.

62 denotes an eyeglass lens, which performs frequency adjustment in accordance with the user's eyesight. A narrow band filter 50 is disposed on the front surface of each eyeglass lens 62, and reflects the display light from the deflection unit 30 toward the user's eyes (the left eye 63L and the right eye 63R) without impairing the user's vision.

In the present embodiment, the incidence angle at the narrow band filter 50 is controlled in accordance with the wavelength change in the light source, but the details of this processing are the same as the first embodiment and therefore description thereof is omitted here.

The embodiments described thus far are examples and various modes can be adopted without departing from the essence of the present disclosure.

The concrete embodiments described above principally include exemplary embodiments having the following composition.

A display apparatus according to an exemplary embodiment includes: a display light emission unit which includes a light source emitting light, forms an image using light emitted from the light source, and emits display light corresponding to formed image; a deflection unit which deflects the display light emitted from the display light emission unit; a narrow band reflection unit which has characteristics of reflecting only light in a reflected wavelength range that is a portion of a reflected wavelength range of visible light and transmitting light of wavelengths other than the reflected wavelength range, and which reflects the display light incident from the deflection unit towards a viewpoint of an observer; and a control unit which changes an incidence angle at which the display light from the deflection unit is incident on the narrow band reflection unit, in accordance with change in a wavelength of the light emitted from the light source, wherein the narrow band reflection unit is configured such that the reflected wavelength range changes when an incidence angle of light which is incident on the narrow band reflection unit changes, and the control unit changes the incidence angle such that a wavelength of the light emitted from the light source is included within the reflected wavelength range of the narrow band reflection unit.

According to this composition, the display light emission includes a light source emitting light, forms an image using light emitted from the light source and emits display light corresponding to formed image. The deflection unit deflects the display light emitted from the display light emission unit. The narrow band reflection unit has characteristics of reflecting only light in a reflected wavelength range that is a portion of a reflected wavelength range of visible light and transmitting light of wavelengths other than the reflected wavelength range. The narrow band reflection unit reflects the display light which is incident from the deflection unit toward a viewpoint of an observer. The control unit changes an incidence angle at which the display light from the deflection unit is incident on the narrow band reflection unit, in accordance with change in a wavelength of the light emitted from the light source. The narrow band reflection unit is configured such that the reflected wavelength range changes when an incidence angle of light which is incident on the narrow band reflection unit changes. The control unit changes the incidence angle such that a wavelength of the light emitted from the light source is included within the reflected wavelength range of the narrow band reflection unit. Therefore, even if the wavelength of light emitted from the light source has changed, it is possible to prevent the occurrence of a double image by changing the incidence angle of the light incident on the narrow band reflection unit such that the wavelength of the light is included within the reflected wavelength range of the narrow band reflection unit.

In the display apparatus described above, for example, the narrow band reflection unit includes a multi-layered film filter made of a low-refractive-index material and a high-refractive-index material or a rugate filter.

According to this composition, the narrow band reflection unit includes a multi-layered film filter made of a low-refractive-index material and a high-refractive-index material or a rugate filter. Therefore, it is possible to reflect only light emitted from the light source, with a high reflectivity.

Furthermore, in the display apparatus described above, for example, the narrow band reflection unit is configured such that the reflected wavelength range changes in a short wavelength direction when the incidence angle becomes larger, and the reflected wavelength range changes in a long wavelength direction when the incidence angle becomes smaller, and the control unit reduces an incidence angle of the display light on the narrow band reflection unit such that a wavelength of light emitted from the light source is included within the reflected wavelength range of the narrow band reflection unit when a wavelength of light emitted from the light source is longer than a maximum wavelength of the reflected wavelength range, and increases an incidence angle of the display light on the narrow band reflection unit such that a wavelength of light emitted from the light source is included within the reflected wavelength range of the narrow band reflection unit when a wavelength of light emitted from the light source is shorter than a minimum wavelength of the reflected wavelength range of the narrow band reflection unit.

According to this composition, the narrow band reflection unit is configured such that the reflected wavelength range changes in the short wavelength direction when the incidence angle becomes larger, and the reflected wavelength range changes in the long wavelength direction when the incidence angle becomes smaller. The control unit reduces the incidence angle of the display light on the narrow band reflection unit such that the wavelength of the light emitted from the light source is included within the reflected wavelength range of the narrow band reflection unit, when the wavelength of the light emitted from the light source is longer than a maximum wavelength of the reflected wavelength range, and increases the incidence angle of the display light on the narrow band reflection unit such that the wavelength of the light emitted from the light source is included within the reflected wavelength range of the narrow band reflection unit, when the wavelength of the light emitted from the light source is shorter than a minimum wavelength of the reflected wavelength range of the narrow band reflection unit.

Since the narrow band reflection unit is composed such that the reflected wavelength range changes in a long wavelength direction when the incidence angle becomes smaller, the reflected wavelength range changes in the long wavelength direction if the incidence angle of the display light on the narrow band reflection unit is made smaller when the wavelength of the light emitted from the light source is longer than the maximum wavelength of the reflected wavelength range. Consequently, it is possible to cause the wavelength of the light emitted from the light source to be included within the reflected wavelength range. Furthermore, since the narrow band reflection unit is composed such that the reflected wavelength range changes in a short wavelength direction when the incidence angle becomes larger, the reflected wavelength range changes in the short wavelength direction if the incidence angle of the display light on the narrow band reflection unit is made larger when the wavelength of the light emitted from the light source is shorter than the minimum wavelength of the reflected wavelength range. Consequently, it is possible to cause the wavelength of the light emitted from the light source to be included within the reflected wavelength range. As a result of this, it is possible to change the incidence angle of the display light on the narrow band reflection unit appropriately, in accordance with change in wavelength of the light source.

Furthermore, for example, the display apparatus described above further includes a temperature detection unit which detects a temperature of the light source, wherein the light source includes a laser light source which emits laser light and has characteristics whereby a wavelength of the laser light becomes longer as a temperature of the light source increases, and a wavelength of the laser light becomes shorter as a temperature of the light source decreases, and the control unit changes the incidence angle based on a temperature of the laser light source detected by the temperature detection unit.

According to this composition, the temperature detection unit detects a temperature of the light source. The light source includes a laser light source which emits laser light and has characteristics whereby a wavelength of the laser light becomes longer as a temperature of the light source increases, and a wavelength of the laser light becomes shorter as a temperature of the light source decreases. The control unit changes the incidence angle based on a temperature of the laser light source detected by the temperature detection unit. Consequently, it is possible to change the incidence angle appropriately, based on the temperature of the laser light source. Furthermore, since a laser light source having a small wavelength range of the emitted light is used, it is possible to restrict the reflected wavelength range of the narrow band reflection unit to a small range. As a result, it is possible to suppress decline in the transmissivity of the narrow band reflection unit.

Furthermore, for example, in the display apparatus described above, the laser light source includes a first laser light source and a second laser light source which emit laser lights having mutually different wavelengths, the narrow band reflection unit has a first multi-layered film filter of which the reflected wavelength range includes a wavelength of laser light emitted from the first laser light source, and a second multi-layered film filter of which the reflected wavelength range includes a wavelength of laser light emitted from the second laser light source, and the first and second multi-layered film filters are respectively composed so as to have an average refractive index whereby an amount of change in the reflected wavelength range with respect to change in the incidence angle is substantially the same in the first and second multi-layered film filters.

According to this composition, the laser light source includes a first laser light source and a second laser light source which emit laser lights having mutually different wavelengths. The narrow band reflection unit has a first multi-layered film filter of which the reflected wavelength range includes a wavelength of laser light emitted from the first laser light source, and a second multi-layered film filter of which the reflected wavelength range includes a wavelength of laser light emitted from the second laser light source. The first and second multi-layered film filters are respectively composed so as to have an average refractive index whereby an amount of change in the reflected wavelength range with respect to change in the incidence angle is substantially the same in the first and second multi-layered film filters. Therefore, it is possible to achieve substantially the same amount of change in the reflected wavelength range of the first and second multi-layered film filters, by changing the incidence angle on the narrow band reflection unit of the display light using the laser light from the first laser light source and the incidence angle on the narrow band reflection unit of the display light using the laser light from the second laser light source, by the same amount by means of the control unit. As a result of this, even if a first and a second laser light source are used, it is possible to prevent the occurrence of a double image, by changing the incidence angle on the narrow band reflection unit.

Furthermore, for example, in the display apparatus described above, the laser light source includes a first laser light source and a second laser light source which emit laser lights having mutually different wavelengths, the narrow band reflection unit includes, as the reflected wavelength range, a first reflected wavelength range in which a wavelength of light emitted from the first laser light source is reflected and a second reflected wavelength range in which a wavelength of light emitted from the second laser light source is reflected, and the narrow band reflection unit is composed such that, when an amount of change in a wavelength of the laser light with respect to temperature change of the second laser light source is smaller than an amount of change in a wavelength of the laser light with respect to temperature change of the first laser light source, a wavelength width of the second reflected wavelength range is smaller than a wavelength width of the first reflected wavelength range.

According to this composition, the laser light source includes a first laser light source and a second laser light source which emit laser lights having mutually different wavelengths. The narrow band reflection unit includes, as the reflected wavelength range, a first reflected wavelength range in which a wavelength of light emitted from the first laser light source is reflected and a second reflected wavelength range in which a wavelength of light emitted from the second laser light source is reflected. The narrow band reflection unit is composed such that, when an amount of change in a wavelength of the laser light with respect to temperature change of the second laser light source is smaller than an amount of change in a wavelength of the laser light with respect to temperature change of the first laser light source, a wavelength width of the second reflected wavelength range is smaller than a wavelength width of the first reflected wavelength range. Consequently, it is possible to suppress decline in the transmissivity of the narrow band reflection unit by the extent to which the wavelength width of the second reflected wavelength range is smaller than the wavelength width of the first reflected wavelength range. As a result, it is possible to optimize the reflected wavelength range required in the narrow band reflection unit in accordance with the temperature characteristics of the light source.

Furthermore, for example, in the display apparatus described above, the first laser light source is constituted by a semiconductor laser light source, and the second laser light source includes a fundamental wave laser light source which emits fundamental wave laser light and a second harmonic generation element which converts the fundamental wave laser light into second harmonic laser light.

According to this composition, the first laser light source is constituted by a semiconductor laser light source. The second laser light source includes a fundamental wave laser light source which emits fundamental wave laser light and a second harmonic generation element which converts the fundamental wave laser light into second harmonic laser light. Consequently, it is possible to optimize the reflected wavelength range required in the narrow band reflection unit, in accordance with the type of laser light source. As a result of this, it is possible to use laser light sources of different types in appropriate fashion.

Furthermore, for example, in the display apparatus described above, the deflection unit is composed so as to diffuse the display light from the display light emission unit in a different diffusion direction at each incident position.

According to this composition, the deflection unit is composed so as to diffuse the display light from the display light emission unit in a different diffusion direction at each incident position. Therefore, by altering the incident position of the display light on the deflection unit, it is possible to change the incidence angle on the narrow band reflection unit.

Furthermore, for example, in the display apparatus described above, a diffusion direction of the display light by the deflection unit is different between when an incident position of the display light is in a region of one end side of the deflection unit in a predetermined direction and when an incident position of the display light is in a region of the other end side of the deflection unit opposite to the one end side in the predetermined direction.

According to this composition, the diffusion direction of the display light by the diffusion unit is different between when an incident position of the display light is in a region of one end side of the deflection unit in a predetermined direction and when an incident position of the display light is in a region of the other end side of the deflection unit opposite to the one end side in the predetermined direction. Therefore, by moving the incident position of the display light on the deflection unit in the predetermined direction, it is possible to change the incidence angle on the narrow band reflection unit.

Furthermore, for example, in the display apparatus described above, the deflection unit includes a fly-eye mirror constituted by arranging a plurality of concave mirrors, and the concave mirrors are arranged at an inclination with respect to an arrangement surface of the fly-eye mirror and are arranged so as to have different angles of inclination depending on a position on the fly-eye mirror.

According to this composition, the deflection unit includes a fly-eye mirror constituted by arranging a plurality of concave mirrors. The concave mirrors are arranged at an inclination with respect to an arrangement surface of the fly-eye mirror and are arranged so as to have different angles of inclination depending on a position on the fly-eye mirror. Therefore, the display light from the display light emission unit is diffused in different diffusion directions by the concave mirrors at each incident position.

Furthermore, for example, in the display apparatus described above, the deflection unit is composed so as to achieve a diffusion angle whereby a width of change in a reflected wavelength, when an incidence angle of the display light on the narrow band reflection unit is changed by the diffusion angle, becomes smaller than a wavelength width of the reflected wavelength range, the diffusion angle being an angle of the display light diffused by the deflection unit.

According to this composition, the deflection unit is composed so as to achieve a diffusion angle whereby a width of change in a reflected wavelength, when an incidence angle of the display light on the narrow band reflection unit is changed by the diffusion angle, becomes smaller than a wavelength width of the reflected wavelength range, the diffusion angle being an angle of the display light diffused by the deflection unit. Therefore, it is possible to prevent the display light from transmitting the narrow band reflection unit and the occurrence of a double image can be prevented.

Furthermore, for example, in the display apparatus described above, the control unit changes an incidence angle of the display light with respect to the narrow band reflection unit, by changing an incident position of the display light which is incident on the deflection unit from the display light emission unit.

According to this composition, the control unit changes the incidence angle of the display light with respect to the narrow band reflection unit, by changing the incident position of the display light which is incident on the deflection unit from the display light emission unit. If the incident position of the display light which is incident on the deflection unit from the display light emission unit is changed, the display light is diffused in a different diffusion direction by the deflection unit. As a result, the incidence angle of the display light with respect to the narrow band reflection unit is changed. Consequently, the incidence angle of the display light on the narrow band reflection unit can be changed without altering the position of the deflection unit.

Furthermore, for example, in the display apparatus described above, the display light emission unit includes a display element which forms the image using light emitted from the light source to display the image on a predetermined display region, the display light emission unit emits the display light corresponding to the image displayed on the display region, and the control unit changes an incident position of the display light on the deflection unit by controlling the display element so as to change a position at which the image is displayed in the display region.

According to this composition, the display light emission unit includes a display element which forms the image using light emitted from the light source to display the image on a predetermined display region. The display light emission unit emits the display light corresponding to the image displayed on the display region. The control unit changes an incident position of the display light on the deflection unit by controlling the display element so as to change a position at which the image is displayed in the display region. Consequently, it is possible to change the incident position of the display light on the deflection unit without providing a movable portion in the display light emission unit.

Furthermore, for example, in the display apparatus described above, the display light emission unit has a direction changing unit which changes an emission direction of the display light, and the control unit changes an incident position of the display light on the deflection unit by changing an incidence angle of the display light which is incident on the deflection unit from the display light emission unit, by means of the direction changing unit.

According to this composition, the display light emission unit has a direction changing unit which changes an emission direction of the display light. The control unit changes an incident position of the display light on the deflection unit by changing an incidence angle of the display light which is incident on the deflection unit from the display light emission unit, by means of the direction changing unit. Therefore, it is possible to easily change the incident position of the display light on the deflection unit, simply by changing the emission direction of the display light.

Furthermore, for example, in the display apparatus described above, the direction changing unit changes an emission direction of the display light by changing an orientation of the display light emission unit with respect to the deflection unit.

According to this composition, the direction changing unit changes an emission direction of the display light by changing an orientation of the display light emission unit with respect to the deflection unit. Consequently, it is possible to easily change the incident position of the display light on the deflection unit.

Furthermore, for example, in the display apparatus described above, the direction changing unit includes a dynamic hologram which is arranged at an aperture section of the display light emission unit and is composed so as to be able to switch between a function of changing an emission direction of the display light and a function of not changing an emission direction of the display light.

According to this composition, the direction changing unit includes a dynamic hologram which is arranged at an aperture section of the display light emission unit and is composed so as to be able to switch between a function of changing an emission direction of the display light and a function of not changing an emission direction of the display light. Consequently, it is possible to easily change the incident position of the display light on the deflection unit, without providing a movable portion in the display light emission unit.

A mobile object according to an exemplary embodiment includes: the display apparatus described above; an operating unit which is operated by the observer; a drive source which generates a drive force for traveling; and a drive control unit which controls the drive source according to operations of the operating unit by the observer.

According to this composition, the operating unit is operated by the observer. The drive source generates a drive force for traveling. The drive control unit controls the drive source according to operations of the operating unit by the observer. By providing the display apparatus described above, even when the wavelength of light emitted from the light source has changed, it is possible to prevent the occurrence of a double image by changing the incidence angle of the light incident on the narrow band reflection unit such that the wavelength of the light is included within the reflected wavelength range of the narrow band reflection unit. Consequently, the observer can operate the operating unit in a suitable fashion.

A control apparatus according to an exemplary embodiment is a control apparatus that controls an image display unit in which a display light emission unit having a light source emitting light forms an image using light emitted from the light source and emits display light corresponding to formed image, the emitted display light is deflected by a deflection unit, and the deflected display light is reflected toward a viewpoint of an observer by a narrow band reflection unit having characteristics of reflecting only light of a partial reflected wavelength range of a wavelength range of visible light and transmitting light of wavelengths other than the reflected wavelength range, and in which the narrow band reflection unit is composed such that the reflected wavelength range changes when an incidence angle of light which is incident on the narrow band reflection unit changes, the control apparatus includes: a first control unit which controls the display light emission unit so as to form the image and cause the display light emission unit to emit the display light corresponding to the formed image; and a second control unit which changes an incidence angle at which the display light from the deflection unit is incident on the narrow band reflection unit, in accordance with change in a wavelength of the light emitted from the light source, wherein the second control unit changes the incidence angle such that a wavelength of the light emitted from the light source is included within the reflected wavelength range of the narrow band reflection unit.

According to this composition, the first control unit controls the display light emission unit so as to form the image, and causes the display light emission unit to emit the display light corresponding to the formed image. The second control unit changes an incidence angle at which the display light from the deflection unit is incident on the narrow band reflection unit, in accordance with change in a wavelength of the light emitted from the light source. The second control unit changes the incidence angle such that a wavelength of the light emitted from the light source is included within the reflected wavelength range of the narrow band reflection unit. Consequently, even when the wavelength of the light emitted from the light source has changed, it is possible to prevent the occurrence of a double image by changing the incidence angle of the light which is incident on the narrow band reflection unit so as to change the reflected wavelength range of the narrow band reflection unit. As a result of this, it is possible to control the image display unit in a suitable fashion.

According to the present disclosure, it is possible to prevent the occurrence of a double image by changing the incidence angle of the display light on the narrow band reflection unit in accordance with change in a wavelength of the light source.

INDUSTRIAL APPLICABILITY

A display apparatus, a mobile object and a control apparatus according to the present disclosure comprise a narrow band reflection unit that reflects light in a reflected wavelength range, and can be applied to a display apparatus, a display system, a display method, and a display program, and the like.

What is claimed is:
1. A display apparatus, comprising:
a display light emission unit which includes a light source emitting light, forms an image using light emitted from the light source, and emits display light corresponding to formed image;

a deflection unit which deflects the display light emitted from the display light emission unit;

a narrow band reflection unit which has characteristics of reflecting only light in a reflected wavelength range that is a portion of a wavelength range of visible light and transmitting light of wavelengths other than the reflected wavelength range, and which reflects the display light incident from the deflection unit towards a viewpoint of an observer; and a control unit which changes an incidence angle at which the display light from the deflection unit is incident on the narrow band reflection unit, in accordance with change in a wavelength of the light emitted from the light source, wherein the narrow band reflection unit is configured such that the reflected wavelength range changes when an incidence angle of light which is incident on the narrow band reflection unit changes, and the control unit changes the incidence angle such that a wavelength of the light emitted from the light source is included within the reflected wavelength range of the narrow band reflection unit.

2. The display apparatus according to claim 1, wherein the narrow band reflection unit includes a multi-layered film filter made of a low-refractive-index material and a high-refractive-index material or a rugate filter.

3. The display apparatus according to claim 2, wherein
the narrow band reflection unit is configured such that the reflected wavelength range changes in a short wavelength direction when the incidence angle becomes larger, and the reflected wavelength range changes in a long wavelength direction when the incidence angle becomes smaller, and the control unit reduces an incidence angle of the display light on the narrow band reflection unit such that a wavelength of light emitted from the light source is included within the reflected wavelength range of the narrow band reflection unit when a wavelength of light emitted from the light source is longer than a maximum wavelength of the reflected wavelength range, and increases an incidence angle of the display light on the narrow band reflection unit such that a wavelength of light emitted from the light source is included within the reflected wavelength range of the narrow band reflection unit when a wavelength of light emitted from the light source is shorter than a minimum wavelength of the reflected wavelength range of the narrow band reflection unit.

4. The display apparatus according to claim 3, further comprising a temperature detection unit which detects a temperature of the light source, wherein
the light source includes a laser light source which emits laser light and has characteristics whereby a wavelength of the laser light becomes longer as a temperature of the light source increases, and a wavelength of the laser light becomes shorter as a temperature of the light source decreases, and the control unit changes the incidence angle based on a temperature of the laser light source detected by the temperature detection unit.

5. The display apparatus according to claim 4, wherein
the laser light source includes a first laser light source and a second laser light source which emit laser lights having mutually different wavelengths,
the narrow band reflection unit has a first multi-layered film filter of which the reflected wavelength range includes a wavelength of laser light emitted from the first laser light source, and a second multi-layered film filter of which the reflected wavelength range includes a wavelength of laser light emitted from the second laser light source, and the first and second multi-layered film filters are respectively composed so as to have an average refractive index whereby an amount of change in the reflected wavelength range with respect to change in the incidence angle is substantially the same in the first and second multi-layered film filters.

6. The display apparatus according to claim 4, wherein
the laser light source includes a first laser light source and a second laser light source which emit laser lights having mutually different wavelengths, the narrow band reflection unit includes, as the reflected wavelength range, a first reflected wavelength range in which a wavelength of light emitted from the first laser light source is reflected and a second reflected wavelength range in which a wavelength of light emitted from the second laser light source is reflected, and the narrow band reflection unit is composed such that, when an amount of change in a wavelength of the laser light with respect to temperature change of the second laser light source is smaller than an amount of change in a wavelength of the laser light with respect to temperature change of the first laser light source, a wavelength width of the second reflected wavelength range is smaller than a wavelength width of the first reflected wavelength range.

7. The display apparatus according to claim 6, wherein
the first laser light source is constituted by a semiconductor laser light source, and the second laser light source includes a fundamental wave laser light source which emits fundamental wave laser light and a second harmonic generation element which converts the fundamental wave laser light into second harmonic laser light.

8. The display apparatus according to claim 1, wherein
the deflection unit is composed so as to diffuse the display light from the display light emission unit in a different diffusion direction at each incident position.

9. The display apparatus according to claim 8, wherein
a diffusion direction of the display light by the deflection unit is different between when an incident position of the display light is in a region of one end side of the deflection unit in a predetermined direction and when an incident position of the display light is in a region of the other end side of the deflection unit opposite to the one end side in the predetermined direction.

10. The display apparatus according to claim 8, wherein
the deflection unit includes a fly-eye mirror constituted by arranging a plurality of concave mirrors, and the concave mirrors are arranged at an inclination with respect to an arrangement surface of the fly-eye mirror and are arranged so as to have different angles of inclination depending on a position on the fly-eye mirror.

11. The display apparatus according to claim 8, wherein
the deflection unit is composed so as to achieve a diffusion angle whereby a width of change in a reflected wavelength, when an incidence angle of the display light on the narrow band reflection unit is changed by the diffusion angle, becomes smaller than a wavelength width of the reflected wavelength range, the diffusion angle being an angle of the display light diffused by the deflection unit.

12. The display apparatus according to claim 8, wherein
the control unit changes an incidence angle of the display light with respect to the narrow band reflection unit, by changing an incident position of the display light which is incident on the deflection unit from the display light emission unit.

13. The display apparatus according to claim 12, wherein
the display light emission unit includes a display element which forms the image using light emitted from the light source to display the image on a predetermined display region,
the display light emission unit emits the display light corresponding to the image displayed on the display region, and
the control unit changes an incident position of the display light on the deflection unit by controlling the display element so as to change a position at which the image is displayed in the display region.

14. The display apparatus according to claim 12, wherein
the display light emission unit has a direction changing unit which changes an emission direction of the display light, and
the control unit changes an incident position of the display light on the deflection unit by changing an incidence angle of the display light which is incident on the deflection unit from the display light emission unit, by means of the direction changing unit.

15. The display apparatus according to claim 14, wherein
the direction changing unit changes an emission direction of the display light by changing an orientation of the display light emission unit with respect to the deflection unit.

16. The display apparatus according to claim 14, wherein
the direction changing unit includes a dynamic hologram which is arranged at an aperture section of the display light emission unit and is composed so as to be able to switch between a function of changing an emission direction of the display light and a function of not changing an emission direction of the display light.

17. A mobile object, comprising:
a display apparatus according to claim 1;
an operating unit which is operated by the observer;
a drive source which generates a drive force for traveling; and
a drive control unit which controls the drive source according to operations of the operating unit by the observer.

18. A control apparatus that controls an image display unit in which a display light emission unit having a light source emitting light forms an image using light emitted from the light source and emits display light corresponding to formed image, the emitted display light is deflected by a deflection unit, and the deflected display light is reflected toward a viewpoint of an observer by a narrow band reflection unit having characteristics of reflecting only light of a partial reflected wavelength range of a wavelength range of visible light and transmitting light of wavelengths other than the reflected wavelength range, and in which the narrow band reflection unit is composed such that the reflected wavelength range changes when an incidence angle of light which is incident on the narrow band reflection unit changes, the control apparatus comprising:
a first control unit which controls the display light emission unit so as to form the image and cause the display light emission unit to emit the display light corresponding to the formed image; and
a second control unit which changes an incidence angle at which the display light from the deflection unit is incident on the narrow band reflection unit, in accordance with change in a wavelength of the light emitted from the light source, wherein
the second control unit changes the incidence angle such that a wavelength of the light emitted from the light source is included within the reflected wavelength range of the narrow band reflection unit.

* * * * *